US012793106B2

(12) United States Patent
Chew et al.

(10) Patent No.: US 12,793,106 B2
(45) **Date of Patent: *Nov. 10, 2026**

(54) UTILIZING A DIRECTIONAL FILTER FOR A GEOTEMPORAL DESTINATION MODE OF A DYNAMIC TRANSPORTATION MATCHING SYSTEM

(71) Applicant: Lyft, Inc., San Francisco, CA (US)

(72) Inventors: Keng Chee Chew, San Francisco, CA (US); Nathan Elliot Fraenkel, Seattle, WA (US); Shachar Chaim Afek Kaufman, San Francisco, CA (US); Aditya Vijay Rathnam, San Francisco, CA (US); Fan Zhang, Millbrae, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/355,439

(22) Filed: Oct. 10, 2025

(65) Prior Publication Data

US 2026/0038011 A1 Feb. 5, 2026

Related U.S. Application Data

(63) Continuation of application No. 16/790,601, filed on Feb. 13, 2020, now Pat. No. 12,443,981.

(51) Int. Cl.
*G06Q 30/0283* (2023.01)
*G01C 21/34* (2006.01)
(Continued)

(52) U.S. Cl.
CPC ....... *G06Q 30/0284* (2013.01); *G01C 21/343* (2013.01); *G01C 21/3438* (2013.01);
(Continued)

(58) Field of Classification Search
CPC .... G06Q 30/0284; G06Q 50/40; G06Q 50/43; G06Q 50/47; G06Q 10/02; G06Q 10/047;
(Continued)

(56) References Cited

U.S. PATENT DOCUMENTS 9,791,291 B1 10/2017 Yamashita et al.
9,898,791 B1 2/2018 Stumpf et al.
(Continued)

FOREIGN PATENT DOCUMENTS

WO 2012/143300 A1 10/2012

OTHER PUBLICATIONS

K.-S. Ang and C.-K. Tham, "Smartphone-based vehicular and activity sensing," 2012 18th IEEE International Conference on Networks (ICON), Singapore, 2012, pp. 1-6, doi: 10.1109/ICON.2012.6506524. (Year: 2012).*
(Continued)

*Primary Examiner* — George Chen
*Assistant Examiner* — Tayar M Kyu
(74) *Attorney, Agent, or Firm* — Keller Preece PLLC

(57) ABSTRACT

This disclosure describes a geotemporal destination system that filters and identifies transportation requests based on a directional filter and/or an arrival time filter. In particular, the disclosed systems can determine a threshold deviation angle for a directional filter based on a provider device location, a target destination, and a time of day. In addition, the disclosed systems can utilize an arrival time filter to identify transportation requests. For example, the disclosed systems can surface transportation requests to provide to a provider device based on applying a directional filter and/or an arrival time filter.

20 Claims, 14 Drawing Sheets

(51) Int. Cl.

| | |
|---|---|
| ***G06Q 10/02*** | (2012.01) |
| ***G06Q 10/047*** | (2023.01) |
| ***G06Q 50/40*** | (2024.01) |
| ***H04L 9/32*** | (2006.01) |
| ***H04W 4/021*** | (2018.01) |

(52) U.S. Cl.
CPC ........... *G06Q 10/02* (2013.01); *G06Q 10/047* (2013.01); *G06Q 50/40* (2024.01); *H04L 9/3213* (2013.01); *H04W 4/021* (2013.01)

(58) Field of Classification Search
CPC ...... G06Q 50/30; G06Q 50/26; G01C 21/343; G01C 21/3438; H04L 9/3213; H04W 4/021
See application file for complete search history.

(56) References Cited

U.S. PATENT DOCUMENTS

| | | | |
|---|---|---|---|
| 10,642,911 | B2 | 5/2020 | Weisner et al. |
| 11,466,998 | B1 | 10/2022 | Williams et al. |
| 2012/0226390 | A1 | 9/2012 | Adams et al. |
| 2014/0129302 | A1 | 5/2014 | Amin et al. |
| 2014/0129951 | A1 | 5/2014 | Amin et al. |
| 2014/0365250 | A1 | 12/2014 | Ikeda et al. |
| 2016/0055605 | A1 | 2/2016 | Kim et al. |
| 2016/0109944 | A1* | 4/2016 | Hiramoto ............... G07C 5/085 701/461 |
| 2016/0337294 | A1 | 11/2016 | Garg et al. |
| 2016/0356615 | A1 | 12/2016 | Arata et al. |
| 2017/0024393 | A1* | 1/2017 | Choksi .............. G06F 16/24578 |
| 2017/0115125 | A1 | 4/2017 | Outwater et al. |
| 2017/0127215 | A1 | 5/2017 | Khan |
| 2017/0220966 | A1 | 8/2017 | Wang |
| 2017/0228846 | A1 | 8/2017 | Mohr et al. |
| 2017/0352125 | A1 | 12/2017 | Dicker et al. |
| 2018/0012148 | A1 | 1/2018 | Law Hui Horng et al. |
| 2018/0172459 | A1 | 6/2018 | Mazzella et al. |
| 2018/0211542 | A1 | 7/2018 | Narayan et al. |
| 2018/0232841 | A1* | 8/2018 | Stumpf .......... G06Q 10/063114 |
| 2018/0260787 | A1 | 9/2018 | Xi |
| 2018/0300660 | A1 | 10/2018 | Coan et al. |
| 2018/0374182 | A1 | 12/2018 | Khanna et al. |
| 2019/0033084 | A1 | 1/2019 | Chen et al. |
| 2019/0164432 | A1 | 5/2019 | Quitoriano et al. |
| 2019/0325546 | A1 | 10/2019 | Hagestad et al. |
| 2020/0012971 | A1 | 1/2020 | Chouinard et al. |
| 2020/0090083 | A1 | 3/2020 | Yang |
| 2021/0256576 | A1 | 8/2021 | Chew et al. |
| 2021/0304078 | A1 | 9/2021 | Holland et al. |
| 2025/0224239 | A1 | 7/2025 | Ramasamy et al. |

OTHER PUBLICATIONS

U.S. Appl. No. 18/059,253, filed Mar. 10, 2026, Office Action.
International Search Report and Written Opinion for App. No. PCT/US23/080918 dated Mar. 14, 2024 (9 pages).
International Preliminary Report on Patentability for App. No. PCT/US23/080918 dated Jun. 6, 2025.
U.S. Appl. No. 15/955,603, filed Jul. 2, 2018, Office Action.
U.S. Appl. No. 15/955,603, filed Jan. 31, 2019, Office Action.
U.S. Appl. No. 15/955,603, filed Jun. 8, 2020, Office Action.
U.S. Appl. No. 15/955,603, filed Dec. 11, 2020, Office Action.
U.S. Appl. No. 16/790,601, filed May 10, 2023, Preinterview 1st Office Action.
U.S. Appl. No. 16/790,601, filed Jun. 29, 2023, 1st Action Office Action.
U.S. Appl. No. 16/790,601, filed Dec. 21, 2023, Office Action.
U.S. Appl. No. 16/790,601, filed May 22, 2024, Office Action.
U.S. Appl. No. 16/790,601, filed Nov. 20, 2024, Office Action.
U.S. Appl. No. 16/790,601, filed Feb. 27, 2025, Office Action.
U.S. Appl. No. 16/790,601, filed Jun. 10, 2025, Notice of Allowance.
U.S. Appl. No. 18/059,253, filed Aug. 27, 2026, Office Action.

* cited by examiner

UTILIZING A DIRECTIONAL FILTER FOR A GEOTEMPORAL DESTINATION MODE OF A DYNAMIC TRANSPORTATION MATCHING SYSTEM

CROSS-REFERENCE TO RELATED APPLICATIONS

The present application is a continuation of U.S. application Ser. No. 16/790,601, filed on Feb. 13, 2020. The aforementioned application is hereby incorporated by reference in its entirety.

BACKGROUND

In recent years, both popularity and usage of on-demand transportation information systems have increased. Indeed, the proliferation of web and mobile applications has enabled requesting devices to utilize on-demand transportation information systems to identify matches with provider devices and then coordinate across computing devices to initiate transportation from one geographic location to another. Despite these advances, conventional on-demand transportation information systems suffer from a number of technical drawbacks particularly in relation to accuracy, efficiency, and flexibility of implementing computer systems in determining digital matches and deploying provider devices.

SUMMARY

This disclosure describes one or more embodiments of methods, non-transitory computer-readable media, and systems that solve the foregoing problems in addition to providing other benefits. In particular, the disclosed systems can utilize a directional filter and/or arrival time filter within a geotemporal destination mode for transportation provider devices to efficiently, flexibly, and accurately generate transportation matches between provider devices and requester devices while navigating the provider devices to target destinations. For example, the disclosed systems can receive a target destination from a provider device and can match the provider device to transportation requests from requestor devices while the provider device travels toward the target destination. To provide transportation requests for the provider device while still traveling toward the destination, the disclosed systems can apply a directional filter to identify those transportation requests that satisfy a threshold deviation angle. The disclosed systems can also identify transportation requests that cause the provider device to satisfy a threshold amount of travel progress toward the target destination while servicing the requests. Furthermore, the disclosed systems can apply an arrival time filter that identifies transportation requests that allow the provider device to serve the transportation requests while still reaching the target destination prior to a target time. Based on utilizing a directional filter and/or arrival time filter for a geotemporal destination transportation matching mode, the disclosed systems can efficiently and flexibly generate more accurate transportation matches between provider devices and requestor devices.

BRIEF DESCRIPTION OF THE DRAWINGS

The detailed description refers to the drawings briefly described below.

DETAILED DESCRIPTION

Figure 1:
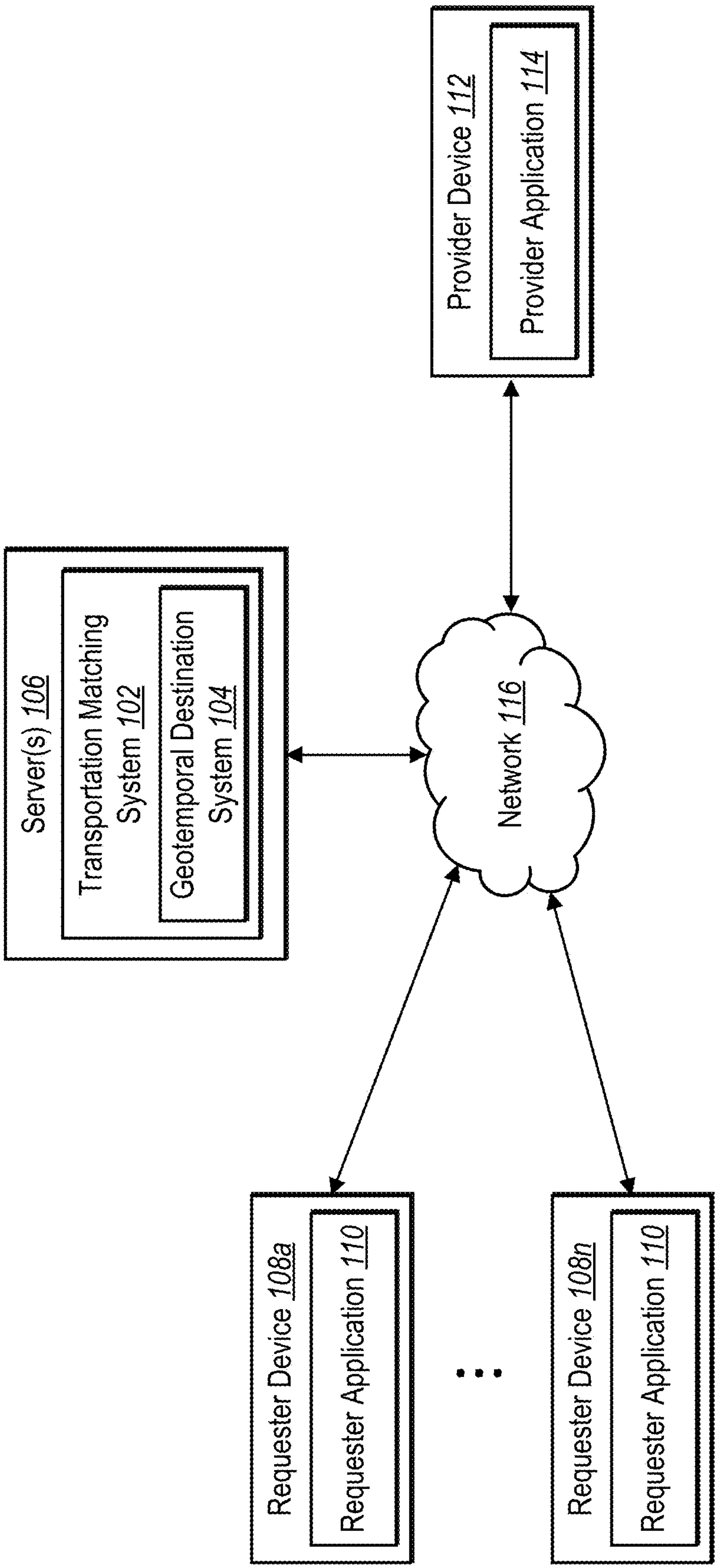
FIG. 1 illustrates a block diagram of an environment for implementing a geotemporal destination system in accordance with one or more embodiments.

This disclosure describes a geotemporal destination system that can utilize a directional filter and/or arrival time filter for a geotemporal destination transportation matching mode in generating transportation matches for transportation provider devices associated with a transportation matching system. In particular, the geotemporal destination system can apply a directional filter to identify transportation requests to surface to a provider device while the provider device travels toward a target destination. For example, the geotemporal destination system can identify transportation requests that are within a threshold deviation angle of a direction from a provider device location to a target destination. Moreover, the geotemporal destination system can identify transportation requests that satisfy an arrival time filter based on a target arrival time that the provider device sets for the target destination. The geotemporal destination system and can also filter out (e.g., reduce or eliminate) transportation requests that do not satisfy the directional filter and/or the arrival time filter.

As mentioned, the geotemporal destination system can utilize a destination transportation matching mode as part of a provider application associated with a transportation matching system. For example, the geotemporal destination system can receive a request to enter a destination transportation matching mode from a provider device along with (or including) an indication of a target destination toward which a provider associated with the provider device would like to travel. While the provider device is utilizing the destination mode, the geotemporal destination system can provide transportation requests to the provider device that satisfy one or more filters such as a directional filter and/or an arrival time filter. Put another way, the geotemporal destination system can select the provider device to service a transportation request based on the transportation request satisfying a directional filter and/or an arrival time filter.

Indeed, the geotemporal destination system can filter transportation requests and identify a request to provide to the provider device based on a directional filter. As a basis for applying a directional filter, the geotemporal destination system can determine a direction from a provider device location to an indicated target destination. The geotemporal destination system can also determine a threshold deviation angle from the determined direction based on various factors such as provider preferences associated with the provider device, a provider device location, a time of day, and/or the target destination. From the determined direction, the geotemporal destination system can also determine deviation angles associated with locations of transportation requests (e.g., drop-off locations, pick-up locations, or request locations). The geotemporal destination system can thus identify a transportation request to provide to the provider device that has a deviation angle within the threshold deviation angle. Additional detail regarding filtering transportation requests based on a threshold angle is provided below with reference to the figures.

Additionally, the geotemporal destination system can utilize different threshold deviation angles for different provider devices and/or based on different circumstances. More particularly, the geotemporal destination system can set a size for a threshold deviation angle for filtering and/or identifying transportation requests based on various factors such as provider preferences (e.g., learned preferences or user-defined preferences), provider device locations, request locations, drop-off locations, destination locations, and/or time information. For instance, the geotemporal destination system can generate a larger threshold angle for a first provider device associated with a first set of preferences and during a slower time of day in a small town. Conversely, the geotemporal destination system can generate a smaller threshold angle for a second provider device associated with a second set of preferences and during a busier time of day (e.g., prime time) in a metropolitan area.

In one or more embodiments, the geotemporal destination system flexibly adapts the threshold angle for individual provider devices (e.g., over successive iterations or sessions of a destination mode by individual provider devices and/or on the fly in real time/near real time within a single session). In particular, the geotemporal destination system can increase or decrease the size of the threshold angle based on behavior of a transportation provider associated with a provider device. For example, if the geotemporal destination system determines that a provider frequently ignores or declines surfaced requests that are in a particular area or that are within a threshold margin of a current threshold angle, the geotemporal destination system can reduce the size of the threshold angle for the provider device. Likewise, the geotemporal destination system can increase the size of the threshold angle for a provider device if the geotemporal destination system determines that the provider frequently (e.g., with at least a threshold frequency) accepts and services requests at or within a threshold margin of the current threshold angle.

In addition to filtering or identifying transportation requests utilizing a directional filter, the geotemporal destination system can utilize an arrival time filter as well. In particular, the geotemporal destination system can apply an arrival time filter in addition (or alternatively) to a directional filter. For example, based on receiving an indication of a selection to use an arrival time filter from a provider device, the geotemporal destination system can identify and/or filter transportation requests based on an arrival time indicated with by the provider device. In some embodiments, the geotemporal destination system utilizes an arrival time filter to identify one or more transportation requests to provide to a provider device that would enable the provider device to arrive at the indicated destination by the arrival time after servicing the transportation request(s).

The geotemporal destination system can utilize other criteria for surfacing transportation requests to providers within the destination mode as well. Particularly, in some embodiments, the geotemporal destination system identifies transportation requests to provide to a provider device based on a destination progress metric. For instance, the geotemporal destination system can provide transportation requests that enable a provider to achieve at least a threshold amount of progress toward the destination per unit of travel (e.g., a distance or a travel time) while servicing the request. In some embodiments, the geotemporal destination system provides transportation requests that enable a provider to travel three minutes toward an indicated destination for every ten minutes of overall travel (e.g., while servicing transportation requests).

In some embodiments, the geotemporal destination system provides additional features associated with a destination mode of a provider application. For instance, the geotemporal destination system can enforce destination mode limitations based on target destination distances or travel times, over-utilization of the destination mode, analysis of destination tokens, or other factors. For example, based on determining that a travel time is not within (e.g., exceeds) a threshold duration, the geotemporal destination system can prevent the provider device from utilizing the destination mode. As another example, the geotemporal destination system can utilize a token status to determine whether a provider device (or a provider account) can utilize a destination mode based on a number of destination mode sessions the provider device/account has previously utilized. In addition, the geotemporal destination system can utilize a dynamic timeout to terminate a destination mode session (e.g., based on determining, at regular intervals, whether a provider device is progressing toward an indicated destination and/or whether the provider device is in an area with fewer than a threshold number of transportation requests).

As mentioned above, conventional on-demand transportation information systems continue to suffer from a number of disadvantages, particularly in their accuracy, efficiency, and flexibility. For example, conventional on-demand transportation information systems are often inaccurate in generating and surfacing transportation matches between requestor devices and provider devices. More specifically, conventional systems often provide transportation requests to provider devices that require significant detours away from provider travel routes to service the requests. Due at least in part to their inaccuracy in surfacing requests for provider devices, conventional systems frequently assign transportation requests to providers that unduly delay providers and prevent providers from punctually adhering to a schedule.

In addition to providing inaccurate transportation requests, many conventional on-demand transportation information systems are also inefficient. In particular, conventional systems often require excessive amounts of computing resources such as processing power, memory, and processing time. Indeed, because of their inaccuracy, conventional systems often receive large numbers of request cancelations and repeat or redundant transportation requests that stem from the request cancelations. Particularly, providers often fail or neglect to arrive at pick-up locations for transportation requests in a timely manner (or to even arrive at all) because of the inaccurate manner in which conventional systems surface requests. Processing such large numbers of needless cancelations and redundant requests consumes excessive computing resources. Indeed, conventional systems often bear the exorbitant processing burden of multiple requests from a requester device, repeated processes for determining locations of the requestor device and provider devices, multiple iterations of applying matching algorithms, repeated transmission of transportation matches to provider devices and requestor devices, and repeated transmission of cancellation requests and notifications.

In addition to their inaccuracy and inefficiency, many conventional on-demand transportation information systems are also inflexible. To elaborate, many conventional systems utilize a rigid rule set for determining which transportation requests to provide to which provider devices. For example, a conventional on-demand transportation information system applies a uniform rule set to assign provider devices to service transportation requests irrespective of individual circumstances. This rigid approach often fails to accommodate specific differences associated with individual provider devices and/or individual transportation requests to assign provider devices to service transportation requests.

The geotemporal destination system provides several advantages and benefits over conventional on-demand transportation information systems. For instance, the geotemporal destination system improves the accuracy of identifying transportation requests to provide to provider devices. Indeed, while many conventional systems provide requests that require providers to take significant detours (or even travel in the wrong direction) from a desired route, the geotemporal destination system can utilize a directional filter based on a threshold deviation angle to identify those transportation requests that facilitate progress toward a desired destination (and filter out or deny those that do not). Additionally, as opposed to some conventional systems that do not adequately account for the time constraints of a provider's schedule, the geotemporal destination system also (or alternatively) utilizes an arrival time filter to identify transportation requests that, upon a provider servicing the requests, enable the provider to arrive at a desired destination by the arrival time.

In addition, the geotemporal destination system improves efficiency by reducing the computing resources required to perform iterative or repetitive processes that plague conventional systems. For example, the geotemporal destination system reduces the number of cancelations received by conventional systems that, due to their inaccuracy in identifying requests to surface to provider devices, often result in excessive numbers of cancelations on the part of both requesters and providers. For example, implementations of the geotemporal destination system have had measured reductions in provider device cancellations, repetitive requests from requestor devices, duplicative processes of detecting and coordinating locations, repeat applications of matching algorithms, transmission of transportation matches across provider devices and requested devices, and transmission of cancellation requests and notifications. Thus, the geotemporal destination system reduces the computing resources for implementing computing systems.

Further, the geotemporal destination system improves the flexibility with which transportation information systems identify transportation requests to surface to provider devices. In contrast with conventional systems that often utilize a rigid rule set for surfacing requests to providers, the geotemporal destination system can flexibly adapt parameters of various filters for different providers, locations, and/or times. Indeed, the geotemporal destination system can modify a threshold angle based on provider behavior, preferences, location, and/or time to identify transportation requests to surface to a provider. In some embodiments, the geotemporal destination system can determine different threshold angles for different providers and can also flexibly modify the threshold angles on the fly while a provider is in a destination mode traveling toward an indicated destination.

As indicated by the foregoing discussion, the present disclosure utilizes a variety of terms to describe features and advantages of the geotemporal destination system. For example, as used herein, the term "destination transportation matching mode" (or simply "destination mode") refers to a mode or variation of a provider application for a transportation matching system. In particular, a destination transportation matching mode refers to a mode of a provider application wherein a provider device can indicate a target destination and can receive transportation requests based on the target destination. Indeed, for a provider device utilizing a destination transportation matching mode, the geotemporal destination system can utilize a particular set of rules or algorithms (e.g., a directional filter and/or an arrival time filter) associated with the destination transportation matching mode to identify and surface transportation requests to the provider device.

Relatedly, the term "target destination" (or simply "destination") refers to a terminal destination selected by a provider device (e.g., a destination where the provider device will arrive without a passenger). In particular, a target destination can include a location received from a provider device that indicates a terminal destination or place where a provider associated with the provider device would like to travel for a destination mode session. In particular, a target destination can refer to a geographical location (e.g., a latitude, a longitude, and/or an elevation) where a provider device selects to end after providing transportation services. Accordingly, a target destination can indicate a termination of a destination mode session—e.g., the geotemporal destination system can terminate a destination mode session upon determining that a provider device arrives at the target destination.

As mentioned, the geotemporal destination system can utilize a directional filter to identify transportation requests to surface to a provider device. As used herein, the term "directional filter" refers to a computer-implemented algorithm or mechanism that identifies and/or filters transportation requests based on a direction relative to a target destination (e.g., relative to a direction between a provider device location and the target destination). In particular, a directional filter can refer to a filter for identifying a transportation request to surface to a provider device and filtering out transportation requests to withhold from the provider device.

For example, the geotemporal destination system can determine a threshold deviation angle to utilize as a basis for a directional filter. As used herein, the term "deviation angle" refers to an angle relative to a target destination. In particular, a deviation angle can include an angular measure (e.g., a number of degrees or radians) relative to a first direction from a provider device location and a target destination. Specifically, the deviation angle can include the angular measure between the first direction and a second direction from the provider device location to a location associated with a transportation request (e.g., a drop-off location, a pick-up location, or a request location).

As also mentioned, the geotemporal destination system can utilize an arrival time filter to identify transportation requests to surface to a provider device. As used herein, the term "arrival time filter" refers to a computer-implemented algorithm or mechanism that identifies and/or filters transportation requests based on a target arrival time associated with a target destination. In particular, an arrival time filter can include rules for identifying and/or filtering out one or more transportation requests based on determining a duration of time associated with servicing the transportation request(s) and further determining whether or not a provider device would be able to arrive at a target destination by a target arrival time after servicing the transportation request (s). In some embodiments, an arrival time filter can include rules for accommodating a threshold measure of error or an arrival time margin for arriving at the target destination by a target arrival time.

Relatedly, the term "target arrival time" (or simply "arrival time") refers to a time selected (e.g., by a provider device) to arrive at a target destination. In particular, a target arrival time can include a time of day that indicates when a provider associated with a provider device desires to arrive at an indicated target destination.

As mentioned, the geotemporal destination system can utilize a destination progress metric to filter out and/or identify transportation requests. As used herein, the term "destination progress metric" refers to a measure of progress associated with a provider device traveling toward a target destination. In particular, a destination progress metric can include a measure or amount of time or distance that a provider device has traveled toward a target destination. In some embodiments, a destination progress metric refers to a reduction in the overall travel time it would take for a provider device to travel to a target destination. In these or other embodiments, a destination progress metric can include a ratio, a proportion, or a percentage of progress that provider device makes per unit of total travel time (or total travel distance). For example, a destination progress metric can indicate that a provider device reduces a travel time to a target destination by at least three minutes for every ten minutes of total travel time.

As further mentioned, the geotemporal destination system can determine a token status based on a number of tokens associated with a provider device. As used herein, the term "token" refers to a session or authorization count for utilizing a destination transportation matching mode of a provider application. In particular, a token can refer to a single authorization for a session of utilizing the destination transportation matching mode. For example, the geotemporal destination system can count a number of tokens associated with a provider device (or a provider account) and can determine whether a provider device (or a provider account) is authorized to utilize the destination mode based on the number of tokens. In some embodiments, the geotemporal destination system assigns a number of tokens to a provider device (or a provider account) and reduces the number with each use or session of the destination mode.

Additional detail regarding the geotemporal destination system will now be provided with reference to the figures. In particular, FIG. 1, illustrates a block diagram of a system environment for implementing a geotemporal destination system 104 in accordance with one or more embodiments. As shown in FIG. 1, the environment includes the server(s) 106 housing the geotemporal destination system 104 as part of a transportation matching system 102. The environment of FIG. 1 further includes requester devices 108*a*-108*n*, a provider device 112, and a network 116. The server(s) 106 can include one or more computing devices to implement the geotemporal destination system 104. The requester devices 108*a*-108*n* and/or the provider device 112 may be or comprise any computing device as described in FIGS. 16-17. Additional description regarding the illustrated computing devices (e.g., the server(s) 106, the requester devices 108*a*-108*n*, and/or the provider device 112) is provided with respect to FIGS. 16-17 below.

As shown, the geotemporal destination system 104 utilizes the network 116 to communicate with the requester devices 108*a*-108*n* and the provider device 112. For example, the geotemporal destination system 104 communicates with the requester devices 108*a*-108*n* and the provider device 112 to match transportation requests received from the requester devices 108*a*-108*n* with the provider device 112. Indeed, the geotemporal destination system 104 can track and communicate a status of the provider device 112 to provide an indicator for a location of the provider device 112 for display on a requester device 108*a* as a vehicle icon within a graphical map. In some embodiments, per device settings, the geotemporal destination system 104 receives device information from the requester devices 108*a*-108*n* and the provider device 112 such as location coordinates (e.g., latitude, longitude, and/or elevation) and status (currently riding, not riding, available, or unavailable) for matching requests.

To facilitate connecting requests with transportation vehicles (e.g., vehicles associated with provider devices), the geotemporal destination system 104 communicates with the requester devices 108*a*-108*n* (e.g., through a requester application 110) and the provider device 112 (e.g., through a provider application 114). As indicated by FIG. 1, the requester devices 108*a*-108*n* include a requester application 110, and the provider device 112 includes a provider application 114. In many embodiments, the geotemporal destination system 104 communicates with the requester devices 108*a*-108*n* and the provider device 112 through the requester application 110 and the provider application 114, respectively to, for example, receive and provide information including transportation request information (e.g., pick-up locations and/or drop-off locations) and provider device information (e.g., provider device locations).

In some embodiments, the provider application 114 can include multiple transportation matching modes (e.g., a destination transportation matching mode) that each correspond to different algorithms or rule sets for matching transportation requests with the provider device 112. Additionally, the requester application 110 and the provider application 114 optionally include computer-executable instructions that, when executed by the requester devices 108*a*-108*n* and the provider device 112, cause the requester devices 108*a*-108*n* and the provider device 112 to perform certain functions as described herein.

As indicated above, the geotemporal destination system 104 can provide (or cause the provider device 112 to render) visual indicators for locations associated with transportation requests. For example, in some cases, the geotemporal destination system 104 selects the provider device 112 to service a transportation request received from one of the requester devices 108*a*-108*n* based on various factors such as a location associated with the transportation request, a provider device location, locations of other provider devices, a directional filter, an arrival time filter, provider incentives, requester incentives, a time of day, traffic information, and/or other transportation matching considerations. Based on selecting the provider device 112 to service the transportation request, the geotemporal destination system 104 provides a visual indicator for the transportation request for display within a user interface displayed on the provider device 112 (e.g., as part of the provider application 114).

Although FIG. 1 illustrates the environment having a particular number and arrangement of components associated with the geotemporal destination system 104, in some embodiments, the environment may include more or fewer components with varying configurations. For example, in some embodiments, the geotemporal destination system 104 can communicate directly with the requester devices 108*a*-108*n*, bypassing the network 116. In these or other embodiments, the geotemporal destination system 104 can be housed (entirely on in part) on the provider device 112. Additionally, the geotemporal destination system 104 can include or communicate with a database for storing transportation request information, directional filter information, arrival time filter information, token information, and/or other information described herein.

As mentioned, the geotemporal destination system 104 can utilize a directional filter and/or an arrival time filter to select a provider device to service a transportation request. In particular, the geotemporal destination system 104 can identify one or more transportation requests to provide to a provider device based on a directional filter and/or an arrival time filter. For example, FIG. 2 illustrates selecting transportation requests based on a directional filter and/or arrival time filter in accordance with one or more embodiments.

Figure 2:
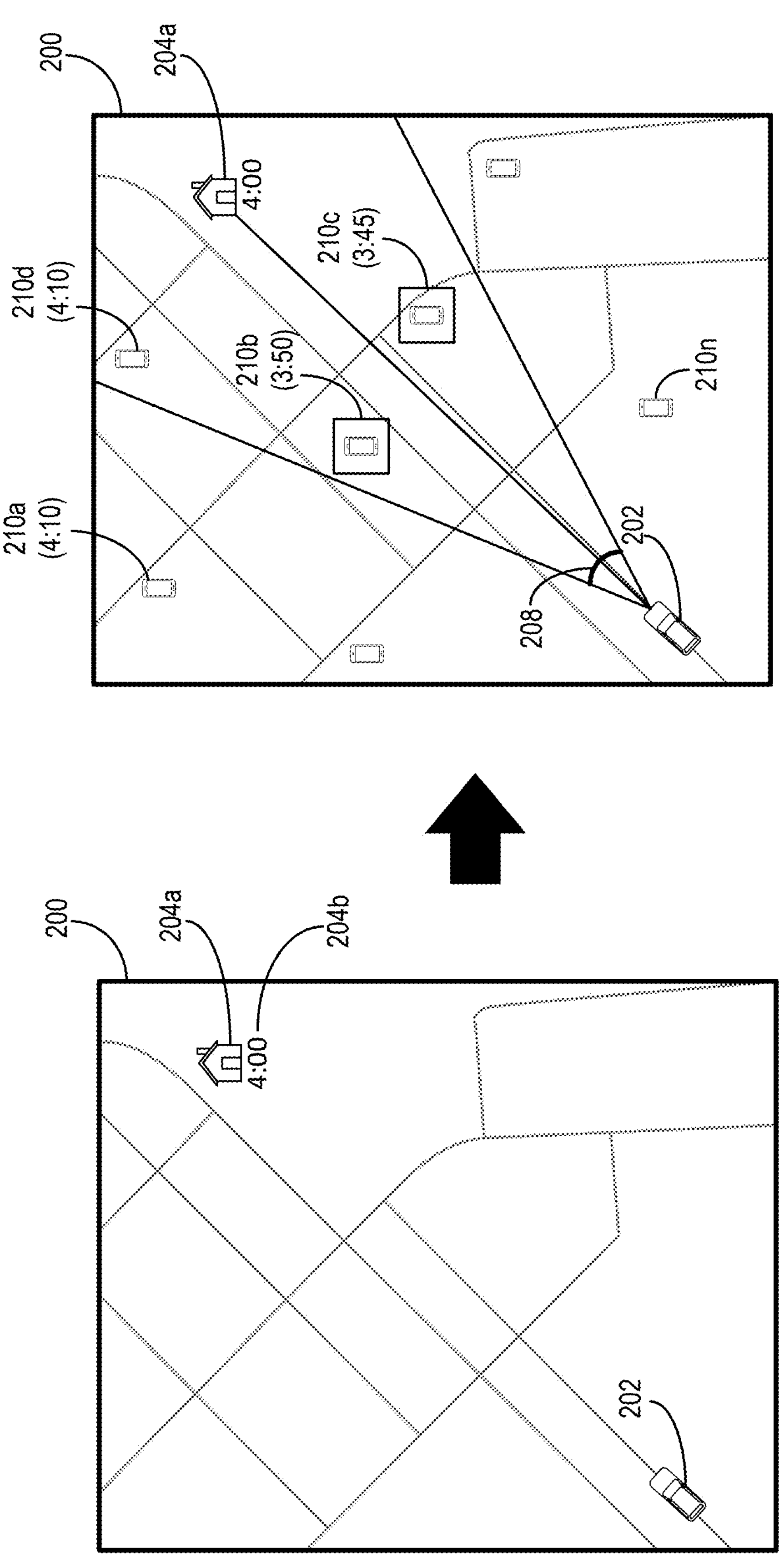
FIG. 2 is a diagram that illustrates selecting and providing transportation requests for a provider device in a geotemporal destination mode in accordance with one or more embodiments.

In particular, FIG. 2 illustrates a map 200 that includes a provider device location 202. The provider device can choose to enter a geotemporal destination mode by selecting a target destination 204*a* and/or an arrival time 204*b*. In response, the geotemporal destination system 104 can monitor transportation requests and surface those transportation requests to the provider device that satisfy a directional filter and/or arrival time filter.

Specifically, as shown in FIG. 2, the geotemporal destination system 104 identifies a plurality of transportation requests 210*a*-210*n*. In addition, the geotemporal destination system determines a threshold deviation angle 208 relative to a direction 206 between the provider device and the target destination 204*a*. Furthermore, for one or more of the transportation requests 210*a*-210*n*, the geotemporal destination system determines an estimated arrival time for the target destination upon servicing the transportation request.

As illustrate, the geotemporal destination system 104 selects transportation requests 210*b* and 210*c* to surface to the provider device 104 based on the directional filter and the arrival time filter. For example, the geotemporal destination system 104 analyzes the transportation request 210*a* and determines that the transportation request 210*a* falls outside of the threshold deviation angle 208 and fails to satisfy the arrival time threshold (e.g., the arrival time of 4:10 falls after the target arrival time of 4:00). Similarly, the geotemporal destination system 104 analyzes the transportation request 210*d* and determines that the transportation request 210*d* falls within the threshold deviation angle 208, but fails to satisfy the arrival time threshold. Accordingly, the geotemporal destination system 104 denies or filters these transportation requests such that the transportation requests are not matched to the provider device.

In contrast, the geotemporal destination system 104 analyzes the transportation requests 210*b* and 210*c* and determines that both satisfy the threshold deviation angle 208 and the target arrival time. Accordingly, the geotemporal destination system 104 provides visual indicators of the transportation requests 210*b* and 210*c* for display at the provider device 104.

Although FIG. 2 illustrates applying both a directional filter and an arrival time filter, it will be appreciated that the geotemporal destination system 104 can apply either a directional filter or an arrival time filter depending on the embodiment and preferences of the provider device. Indeed, as discussed in greater detail below, the geotemporal destination system 104 can customize a variety of filter settings within destination mode to improve accuracy and efficiency of transportation matches.

Figure 3:
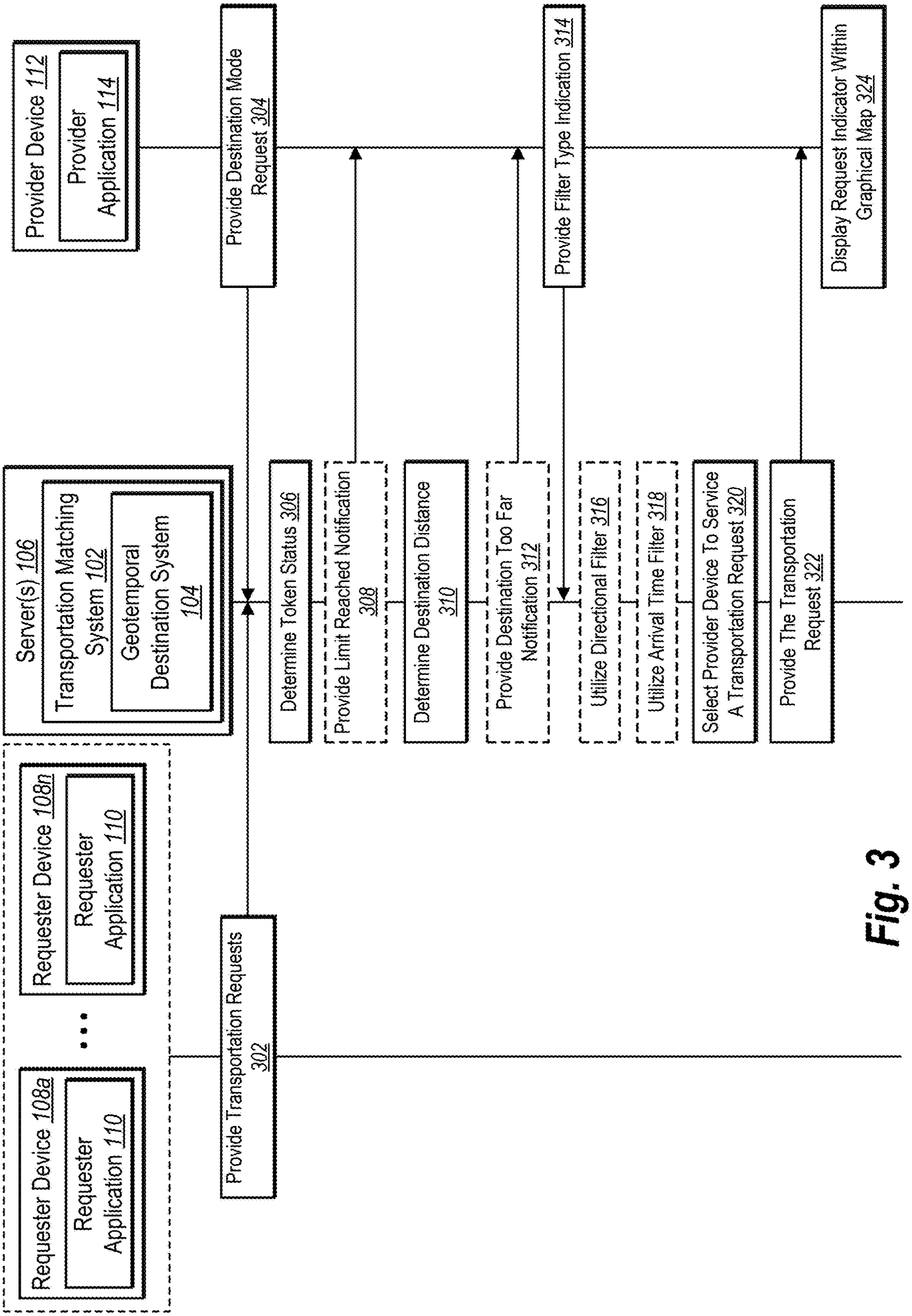
FIG. 3 illustrates an example sequence flow diagram for acts associated with the geotemporal destination system in accordance with one or more embodiments.

As mentioned above, the geotemporal destination system 104 can manage a variety of requests, settings, and communications across provider devices and requester devices to determine transportation matches for provider devices utilizing a geotemporal destination mode. FIG. 3 illustrates a series of acts 302-324 performed by the requester devices 108*a*-108*n*, the geotemporal destination system 104, and/or the provider device 112 that are involved in selecting the provider device 112 to service a transportation request based on a directional filter and/or an arrival time filter in accordance with one or more embodiments.

As illustrated in FIG. 3, the requester devices 108*a*-108*n* perform an act 302 to provide transportation requests to the geotemporal destination system 104. In turn, the geotemporal destination system 104 receives the transportation requests from the requester devices 108*a*-108*n*. For example, the geotemporal destination system 104 receives a transportation request from the requester device 108*a* that indicates a pick-up location where a provider is to pick up a requester associated with the requester device 108*a* and that further indicates a drop-off location where a provider is to drop off the requester to complete service for the transportation request.

In addition, the provider device 112 performs an act 304 to provide a destination mode request. In particular, the provider device 112 detects a user input to select a destination mode element within the provider application 114 to enter or utilize a destination transportation matching mode of the provider application 114. The provider device 112 further detects or receives a target destination along with (or as part of) the request to enter destination mode. Thus, the geotemporal destination system 104 receives the request to enter destination mode from the provide device 112 and further identifies the target destination associated with the provider device 112. In some embodiments, the geotemporal destination system 104 receives the target destination from the provider device 112 as a separate communication from the request to utilize the destination mode.

As further shown in FIG. 3, the geotemporal destination system 104 performs an act 306 to determine a token status. In particular, the geotemporal destination system 104 determines a token status for the provider device 112 based on receiving a request to utilize the destination mode. More specifically, the geotemporal destination system 104 determines whether the provider device 112 (or a provider account associated with the provider device 112) is authorized to utilize the destination mode based on a number of tokens associated with the provider device 112 (or the provider account).

In some embodiments, the geotemporal destination system 104 assigns the provider device 112 (or the provider account) a particular number of tokens (e.g., 6 tokens or 2 tokens) per period of time (e.g., per day or per week). Each time the geotemporal destination system 104 receives a request to utilize the destination mode from the provider device 112, the geotemporal destination system 104 reduces (e.g., decrements) the number of tokens associated with the provider device 112 (or the provider account). For example, the geotemporal destination system 104 reduces the number of tokens based on an initial request as well as any change in target destination and/or any change in filter type (e.g., between a directional filter or an arrival time filter). Upon determining that the provider device 112 (or the provider account) have no remaining tokens for a given time period, the geotemporal destination system 104 prevents the provider device 112 from utilizing the destination mode.

For instance, the geotemporal destination system 104 performs an act 308 to provide a limit reached notification. Indeed, based on a number of tokens associated with the provider device 112 (or the provider account), the geotemporal destination system 104 determines whether the provider device 112 can utilize the destination mode to enter a target destination and utilize one or more of the directional filter or the arrival time filter. Based on determining that the provider device 112 (or the provider account) has no remaining tokens, the geotemporal destination system 104 provides a notification to the provider device 112 that indicates that a limit for utilizing the destination mode has been reached. Additional detail regarding the limit reached notification is provided below with reference to FIG. 8.

As further illustrated in FIG. 3, the geotemporal destination system 104 performs an act 310 to determine a destination distance. In particular, the geotemporal destination system 104 determines a distance from a current provider device location to a target destination indicated by the provider device 112. In some embodiments, the geotemporal destination system 104 determines a travel time from a current provider device location to the target destination. In any case, the geotemporal destination system 104 compares the determined distance or the determined travel time to a threshold distance or a threshold travel time.

Based on determining that the distance or the travel time are within a respective threshold, the geotemporal destination system 104 determines that the provider device 112 can utilize the destination mode to travel to the target destination and receive transportation requests while traveling. Based on determining that the distance or the travel time are not within a respective threshold, on the other hand, the geotemporal destination system 104 determines that the provider device 112 cannot utilize the destination mode. Instead, the geotemporal destination system 104 performs an act 312 to provide an excessive destination notification. For example, the geotemporal destination system 104 provides a notification for display on the provider device 112 that indicates that the target destination is too far from the current provider device location. Additional detail regarding the excessive destination notification is provided below with reference to FIG. 9.

As shown in FIG. 3, the provider device 112 performs an act 314 to provide a filter type indication. In particular, the provider device 112 receives or detects a user input to select a filter type such as a directional filter or an arrival time filter within the destination mode. In some embodiments, the provider device 112 receives a user input to utilize multiple filters together such as a directional filter and an arrival time filter. In any event, the provider device 112 provides the indication to the geotemporal destination system 104.

Based on receiving the filter type indication from the provider device 112, the geotemporal destination system 104 determines which filter(s) to apply for identifying transportation requests to provide to the provider device 112. In some embodiments, the geotemporal destination system 104 performs an act 316 to utilize a directional filter. In particular, the geotemporal destination system 104 utilizes a directional filter to filter out and/or identify transportation requests (e.g., from among the transportation requests received as a result of the act 302).

For example, the geotemporal destination system 104 determines a direction from a provider device location to a target destination. From the determined direction, the geotemporal destination system 104 determines a threshold deviation angle based on various factors such as provider preferences, a provider device location, a target destination, and/or a time of day. Based on the threshold deviation angle, the geotemporal destination system 104 determines whether or not to select the provider device 112 to service a particular transportation request. Indeed, the geotemporal destination system 104 determines deviation angles for individual transportation requests by determining directions from the provider device location to locations associated with respective transportation requests and determining angles between the direction from the provider device location to the target destination and the directions from the provider device location to the respective locations associated with the transportation requests. For deviation angles that are within the threshold deviation angle, the geotemporal destination system 104 determines that the provider device 112 can service the corresponding transportation request. Additional detail regarding the directional filter is provided below with reference to FIGS. 4A-4B.

In these or other embodiments, the geotemporal destination system 104 additionally (or alternatively) performs an act 318 to utilize an arrival time filter. In particular, the geotemporal destination system 104 determines a target arrival time associated with a target destination and filters out or identifies transportation requests (from among the transportation requests received as a result of the act 302) to provide to the provider device 112 based on the arrival time. In some embodiments, the geotemporal destination system 104 receives an indication of the target arrival time from the provider device 112 either together with the filter type indication (e.g., as part of the act 314) or as a separate communication.

In any event, the geotemporal destination system 104 determines a duration of time associated with servicing a given transportation request. The geotemporal destination system 104 further determines whether the provider device could arrive at the target destination by the target arrival time after servicing the transportation request. In some embodiments, the geotemporal destination system 104 utilizes a threshold error or margin of time with respect to the target arrival time for arriving at the target destination.

Based on determining that the provider device 112 is able to arrive at the target destination by the arrival time (or within a threshold error or margin of the target arrival time), the geotemporal destination system 104 can select the provider device 112 to service the transportation request. Additional detail regarding the arrival time filter is provided below with reference to FIG. 6.

In some embodiments, the geotemporal destination system 104 further utilizes a destination progress metric. More particularly, the geotemporal destination system 104 determines, for particular transportation requests, an amount (e.g., a time or a distance) of progress that the provider device 112 would make toward a target destination due to servicing the transportation request. In some embodiments, the geotemporal destination system 104 utilizes a progress threshold and determines whether the reduction in travel to the target destination due to servicing a transportation request satisfies the progress threshold. For example, the geotemporal destination system 104 utilizes a progress threshold as a ratio of travel time or distance where any transportation request that is to be provided to the provider device 112 must enable the provider device 112 to travel three minutes (or distance units) closer to the target destination for every ten minutes (or distance units) of overall travel while servicing the transportation request. Additional detail regarding the destination progress metric and the progress threshold is provided below with reference to FIG. 5.

As illustrated in FIG. 3, the geotemporal destination system 104 further performs an act 320 to select the provider device to service a transportation request. More specifically, the geotemporal destination system 104 identifies a transportation request (from among the transportation requests received as a result of the act 302) that satisfies a directional filter, an arrival time filter, and/or a progress threshold. In addition, the geotemporal destination system 104 determines other factors such as provider availability status, locations of other provider devices, incentives for requesters and/or providers, current travel directions of various provider devices (including the provider device 112), provider ratings, and/or requester ratings to determine to select the provider device 112 to service the transportation request. Based on a consideration of one or more of these factors, the geotemporal destination system 104 thus selects the provider device 112 to service the identified transportation request.

For example, in some embodiments, the geotemporal destination system 104 weights the directional filter and/or the arrival time filter as part of determining whether to select the provider device 112 to service a transportation request. More particularly, the geotemporal destination system 104 applies a directional filter weight and/or an arrival time filter weight and determines a weighted combination of the various factors for selecting transportation providers to service transportation requests. In some embodiments, the geotemporal destination system 104 weights the directional filter or the arrival time filter more heavily than other factors (such as requestor wait time or number of available drivers) to emphasize the filters in selecting provider devices to service transportation requests.

Based on selecting the provider device 112 to service the transportation request, the geotemporal destination system 104 further performs an act 322 to provide the transportation request to the provider device 112. In particular, the geotemporal destination system 104 provides information associated with the transportation request including a pick-up location, a route/travel time to the pick-up location, a drop-off location, a route/travel time to the drop-off location, a requester identification, a drop-off time, a route/travel time to the target destination from the drop-off location, an arrival time at the target destination, and/or other information to the provider device 112 for servicing the transportation request.

In response to receiving the transportation request from the geotemporal destination system 104, the provider device 112 performs an act 324 to display a request indicator within a graphical map. In particular, the geotemporal destination system 104 can cause the provider device 112 to display a graphical map within a user interface (e.g., a destination mode interface). In addition, the geotemporal destination system 104 can provide a visual indicator for display within the graphical map that indicates a location (e.g., a pick-up location), a route/travel time to the pick-up location, a drop-off location, a route/travel time to the drop-off location, a requester identification, a drop-off time, a route/travel time to the target destination from the drop-off location, an arrival time at the target destination, and/or other information for the transportation request.

In one or more embodiments, the geotemporal destination system 104 further utilizes a dynamic timeout metric for the provider device 112. In particular, rather than timing out the provider device 112 utilizing the destination transportation matching mode (e.g., terminating the destination transportation matching mode) after a set timeout threshold (e.g., 30 minutes), the geotemporal destination system 104 utilizes dynamic timeouts. For example, the geotemporal destination system 104 repeatedly determines whether one or more dynamic timeout criteria are satisfied.

In some embodiments, the geotemporal destination system 104 regularly checks (e.g., every 5 minutes) whether the provider device 112 is currently making progress toward a target destination and whether the provider device 112 is in an area (e.g., a geohash) with fewer than a threshold number or frequency of transportation requests. To determine whether the provider device 112 is making progress toward the target destination, the geotemporal destination system 104 determines an original travel time for navigating to a target destination (e.g., at the time the geotemporal destination system 104 receives the target destination from the provider device 112) and further determines a current travel time to the target destination (based on where the provider device 112 is located at a given point in time after the initial indication of the target destination).

To determine whether the provide device 112 is making progress toward a target destination, the geotemporal destination system 104 determines whether the provider device 112 is traveling at least a threshold distance toward the target destination per period of time. In some embodiments, the geotemporal destination system 104 periodically (e.g., on 1-minute or 5-minute intervals) receives updates to the location of the provider device 112 and compares a distance from the provider device 112 to the target destination with that of the previous location update. If the difference between the two distances satisfies a threshold, then the geotemporal destination system 104 determines that the provider device 112 is making a threshold amount of progress toward the target destination.

In one or more embodiments, the geotemporal destination system 104 determines a number of time increments (e.g., 5-minute increments) that have elapsed since the provider device first entered destination mode (e.g., since the geotemporal destination system 104 received the target destination). Additionally, the geotemporal destination system 104 compares the number of time increments with a difference between the original travel time and the current travel time. For example, if the difference between the original travel time and the current travel time is greater than the number of time increments (or 1.5× the number of time increments), then the geotemporal destination system 104 determines that the provider device 112 is making progress toward the target destination.

As another part of the dynamic timeout criteria, the geotemporal destination system 104 determines whether the provider device 112 is in an area with fewer than a threshold number of transportation requests. To determine whether the provider device 112 is in an area with fewer than a threshold number of transportation requests, the geotemporal destination system 104 determines a number of filtered transportation requests (e.g., transportation requests that satisfy the directional filter and/or the arrival time filter) that have occurred since the provider device 112 has entered destination mode (or has been idle or not currently servicing transportation requests while in destination mode).

In addition, the geotemporal destination system 104 determines an average number of filtered requests that occur over a time interval. In particular, the geotemporal destination system 104 determines a time that the provider device 112 enters destination mode and determines a duration of time that the provider device 112 is not servicing transportation requests while in destination mode. The geotemporal destination system 104 further determines a number of transportation requests that are surfaced to the provider device 112 without the provider device 112 accepting a transportation request during the time the provider device 112 is in destination mode but not servicing requests.

In some embodiments, the geotemporal destination system 104 compares the number of filtered requests that have occurred while the provider device 112 has been idle (e.g., not servicing transportation requests) in destination mode with the number of time increments that have elapsed since the provider device 112 entered destination mode and the average number of filtered requests over a time interval. If the geotemporal destination system 104 determines that the number of filtered requests while the provider device 112 is idle in destination mode is less than a threshold number of filtered requests, then the geotemporal destination system 104 determines that the provider device 112 is in an area with fewer than a threshold number of transportation requests. In some embodiments, if the geotemporal destination system 104 determines that the number of filtered requests that have occurred while the provider device 112 has been idle in destination mode is less than a combination (e.g., a product) of the number of time increments that have elapsed since the provider device 112 entered destination mode and the average number of filtered requests over a time interval, then the geotemporal destination system 104 determines that the provider device 112 is in an area with fewer than a threshold number of transportation requests.

If the geotemporal destination system 104 determines that both dynamic timeout criteria are false—i.e., that the provider device 112 is neither making progress toward the target destination and that the provider device 112 is not in an area with fewer than a threshold number of transportation requests—or if the geotemporal destination system 104 determines that the provider device 112 is idle in destination mode for 45 minutes, then the geotemporal destination system 104 times out (e.g., terminates) destination mode for the provider device 112. Otherwise, the geotemporal destination system 104 refrains from timing out the provider device 112 and enables the provider device 112 to continue the destination mode session.

Figure 4B:
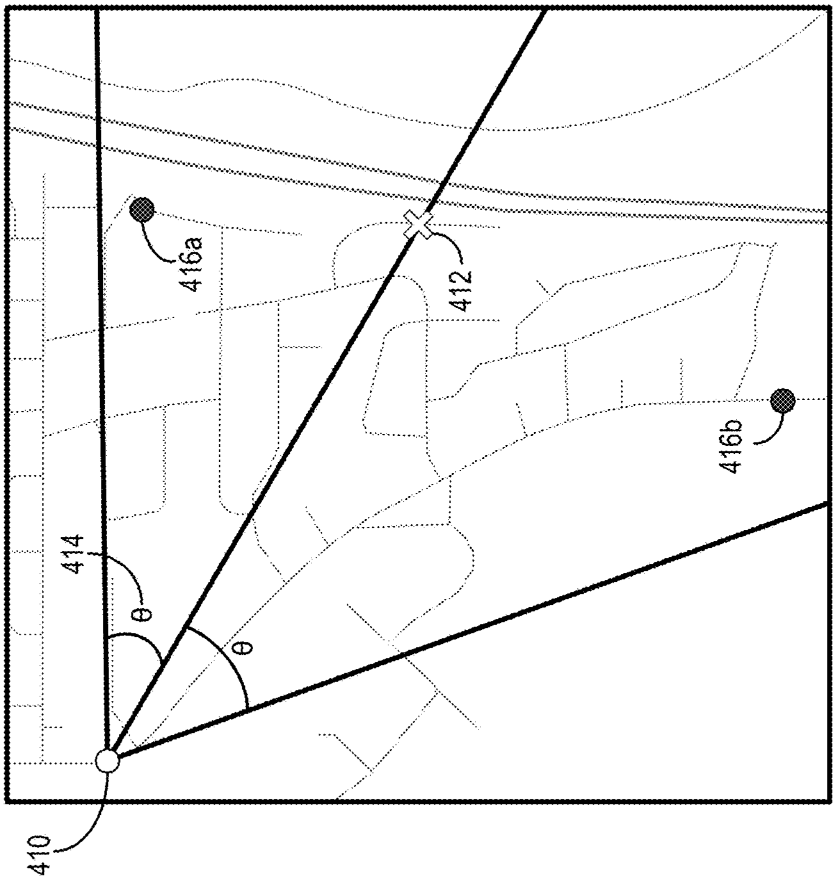
FIGS. 4A-4B illustrate an example diagram of determining a threshold deviation angle for a directional filter in accordance with one or more embodiments.
Figure 4A:
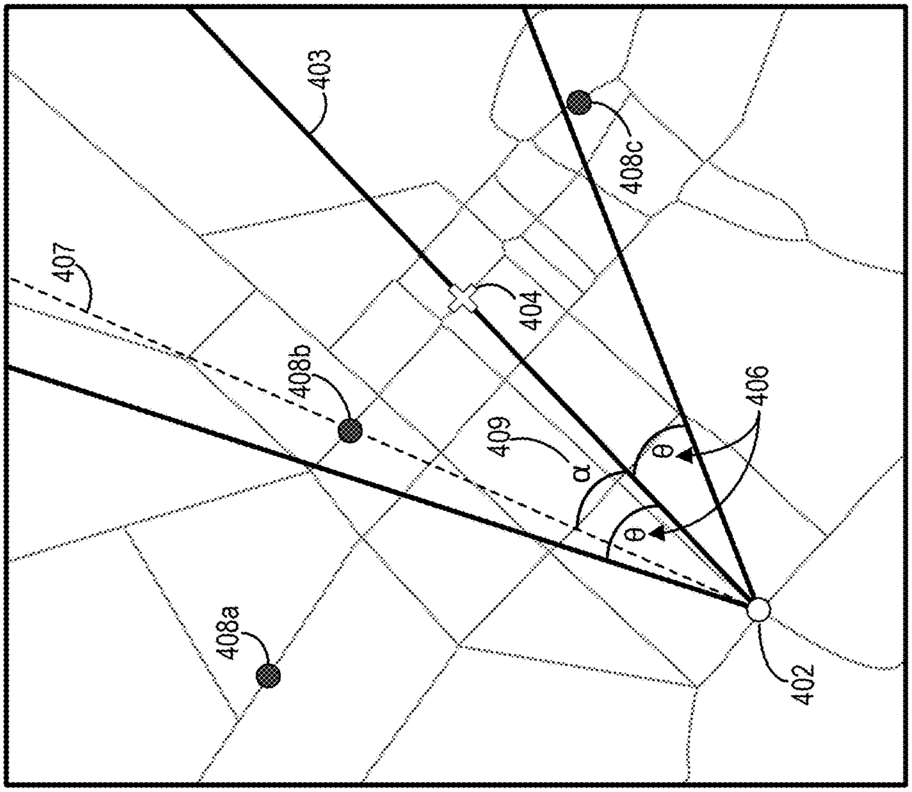

As mentioned, the geotemporal destination system 104 can utilize a directional filter to identify and/or filter transportation requests to surface to a provider device (e.g., the provider device 112). In particular, the geotemporal destination system 104 can determine a threshold deviation angle to distinguish between transportation requests that satisfy the directional filter and transportation requests that do not satisfy the directional filter. FIGS. 4A-4B illustrate different variations of a directional filter that a geotemporal destination system 104 can implement in accordance with one or more embodiments.

As shown in FIG. 4A, the geotemporal destination system 104 determines a threshold deviation angle 406, represented by the symbol θ. In particular, the geotemporal destination system 104 determines the threshold deviation angle 406 based on the provider device location 402 and the target destination 404. As illustrated, the geotemporal destination system 104 determines a direction 403 from the provider device location 402 to the target destination 404. The geotemporal destination system 104 utilizes the determined direction 403 and the threshold deviation angle 406 to identify locations that satisfy the directional filter. In particular, the geotemporal destination system 104 can determine that locations that fall within the threshold deviation angle 406 relative to the direction 403 satisfy the directional filter. Similarly, the geotemporal destination system 104 can determine that locations that fall outside the threshold deviation angle 406 relative to the direction 403 do not satisfy the directional filter (moreover, the geotemporal destination system 104 can deny or filter transportation requests from those locations with regard to the provider device).

To determine a size for the threshold deviation angle 406 (e.g., a number of degrees or radians), the geotemporal destination system 104 determines the provider device location 402 and the target destination 404. In particular, the geotemporal destination system 104 determines a geohash (e.g., a geohash-6 or a geohash-7) for the provider device location 402 and/or a geohash for the target destination 404. In some embodiments, the geotemporal destination system 104 determines that a particular geohash is associated with a corresponding size of threshold deviation angle. For example, the geotemporal destination system 104 determines that a busier metropolitan area corresponds to a smaller threshold deviation angle (e.g., because such areas generally have higher numbers/densities of transportation requests). Conversely, the geotemporal destination system 104 determines that a less busy rural area corresponds to a larger threshold deviation angle (e.g., because such areas generally have fewer requests or a lower density of requests).

In some embodiments, the geotemporal destination system 104 determines the threshold deviation angle 406 based further (or alternatively) on a time of day and/or provider preferences. In particular, the geotemporal destination system 104 determines that particular times of day correspond to different numbers, frequencies, and/or densities of transportation requests. For example, the geotemporal destination system 104 determines that prime time hours (e.g., 5 pm to 7 pm) generally have large numbers of transportation requests. Thus, the geotemporal destination system 104 generates the threshold deviation angle 406 to be tighter or smaller (e.g., to have a smaller magnitude) so that the directional filter identifies transportation requests in a smaller area more in line with the direction 403.

In some embodiments, the geotemporal destination system 104 determines the threshold deviation angle 406 based on a time of day (or a time of week) and a location (e.g., the provider device location 402 and/or the target destination 404). For example, the geotemporal destination system 104 determines that, at 2 pm in the geohash associated with the provider device location 402, there are relatively few transportation requests. Thus, the geotemporal destination system 104 generates the threshold deviation angle 406 to have a relatively large magnitude to cover a larger area. Other factors that impact how the geotemporal destination system 104 determines the threshold deviation angle 406 include traffic, weather, road construction, or events (e.g., sporting events, fairs, or conventions). For instance, if the geotemporal destination system 104 determines that traffic is particularly bad or that certain roads are under construction, resulting in servicing transportation requests in those areas being more costly, the geotemporal destination system 104 may generate the threshold deviation angle 406 to have a smaller magnitude.

Relating to the considerations of a time of day, the geotemporal destination system 104 further considers the effects of holidays and various events (e.g., sporting events, fairs, conventions, etc.). Indeed, holidays and events (as well as weather and road construction) can impact transportation request volume as well as traffic conditions, timing requirements for servicing transportation requests, and various costs of providing service. For example, the geotemporal destination system 104 determines that event traffic on a particular day will increase request volume for a particular geohash, and the geotemporal destination system 104 generates the threshold deviation angle 406 to have a smaller magnitude. As another example, the geotemporal destination system 104 determines that transportation requests on Thanksgiving Day is particularly low, and the geotemporal destination system 104 generates the threshold deviation to have a larger magnitude accordingly.

In addition (or alternatively) to times and locations, the geotemporal destination system 104 can also consider provider preferences for generating the threshold deviation angle 406. In particular, in some embodiments, the geotemporal destination system 104 receives an indication of one or more provider preferences from the provider device 112. For example, the geotemporal destination system 104 receives an indication of a margin angle (e.g., 3 degrees or 5 degrees) of flexibility around the threshold deviation angle 406 within which the provider device 112 can service transportation requests, an indication of a particular area that a provider associated with the provider device 112 desires to (or not to) travel, and/or an indication that the provider is (or is not) willing to take large detours while navigating toward the target destination 404. The geotemporal destination system 104 thus generates the threshold deviation angle 406 based on the indicated preferences.

In one or more embodiments, the geotemporal destination system 104 enables the provider device 112 to set the threshold deviation angle 406. In particular, the geotemporal destination system 104 provides a threshold deviation angle option to the provider device 112 for display within a user interface. To elaborate, the geotemporal destination system 104 provides an interactive slider element or an interactive threshold deviation angle element (e.g., as shown in FIG. 4A) for display on the provider device 112. The geotemporal destination system 104 further receives an indication of a size or magnitude for the threshold deviation angle 406 based on user input setting the slider or the deviation angle element and generates the threshold deviation angle 406 accordingly.

In addition (or alternatively) to receiving indications of user preferences, the geotemporal destination system 104 learns preferences associated with the provider device 112 (or a provider account associated with the provider device 112). More specifically, the geotemporal destination system 104 monitors, in accordance with device settings and privacy regulations, behavior associated with the provider device 112 over time to determine patterns associated with the provider device 112. For example, the geotemporal destination system 104 determines areas where the provider device 112 frequently accepts (or declines or ignores) transportation requests.

As another example, the geotemporal destination system 104 determines relationships (e.g., distances or differences in angles) of accepted (or declined or ignored) transportation requests with respect to a threshold deviation angle 406. Based on the relationships, the geotemporal destination system 104 adjusts the threshold deviation angle 406 over time based on tendencies of the provider device 112 to accept (or decline or ignore) transportation requests having particular relationships with respect to the threshold deviation angle 406. In some embodiments, the geotemporal destination system 104 utilizes one or more machine learning models (e.g., neural networks) to learn preferences associated with the provider device 112 and build a predictive model to indicate transportation requests that satisfy a threshold probability that the provider device 112 will service them. For example, the geotemporal destination system 102 can train a deep convolutional neural network to predict transportation requests that match a particular provider device 112 (or provider account) based on training (e.g., historical) requests and ground truth servicing data. For instance, if the geotemporal destination system 104 determines that the provider device 112 is not likely (based on historical behavior) to accept transportation requests that are near (e.g., within 3 degrees or 5 degrees) of the threshold deviation angle 406, the geotemporal destination system 104 generates a smaller threshold deviation angle for the provider device 112 on a subsequent session of the provider device 112 utilizing the destination mode.

To determine whether a transportation request satisfies the threshold deviation angle 406, the geotemporal destination system 104 determines deviation angles associated with individual transportation requests. As shown, the geotemporal destination system 104 determines a deviation angle 409, as represented by the symbol «, associated with a particular transportation request. The location 408*b* can represent one or more locations of the particular transportation request such as a pick-up location for the transportation request and/or a drop-off location for the transportation request. For example, the geotemporal destination system 104 can ensure that one or both of the pick-up location and drop-off location fall within the deviation angle. In either case, the geotemporal destination system 104 determines the deviation angle 409 based on the location 408*b*.

More specifically, the geotemporal destination system 104 determines a direction 407 from the provider device location 402 to the location 408*b*. The geotemporal destination system 104 further determines the deviation angle 409 from the direction 403 (from the provider device location 402 to the target destination 404) to the direction 407 (from the provider device location 402 to the location 408*b*). Upon determining that the deviation angle 409 is within (or smaller than) the threshold deviation angle 406, the geotemporal destination system 104 determines that the transportation request associated with the location 408*b* satisfies the directional filter. In some embodiments, the geotemporal destination system 104 utilizes a threshold deviation angle 406 of 60 degrees. Based on determining that the location 408*b* satisfies the directional filter, the geotemporal destination system 104 selects the provider device 112 to service the transportation request and provides the transportation request (including the location 408*b*) to the provider device 112.

In addition to the location 408*b*, the geotemporal destination system 104 also determines deviation angles associated with the locations 408*a* and 408*c* (which locations can be pick-up locations or drop-off locations associated with respective transportation requests). In particular, the geotemporal destination system 104 determines a deviation angle associated with the location 408*a* that is larger than the threshold deviation angle 406. Therefore, the geotemporal destination system 104 determines not to select the provider device 112 to service the transportation request associated with the location 408*a*, and the geotemporal destination system 104 does not surface the transportation request to the provider device 112.

Additionally, the geotemporal destination system 104 determines a deviation angle associated with the location 408*c*. In some embodiments, the geotemporal destination system 104 refrains from providing the corresponding transportation request to the provider device 112 because the deviation angle for the location 408*c* is larger than the threshold deviation angle 406. In other embodiments, however, the geotemporal destination system 104 nevertheless selects the provider device 112 to service the transportation request and provides the transportation request to the provider device 112.

For example, in some embodiments the geotemporal destination system 104 applies a weighting of various factors to determine which transportation requests to surface to the provider device 112. In particular, the geotemporal destination system 104 weights the directional filter along with various other factors such as requester wait time, number of available providers, distance(s) to next available provider(s), an arrival time filter, provider ratings, conversion probabilities, cancelation probabilities, expected values for transportation requests, requester preferences, requester incentives, provider incentives, timing considerations, and location considerations for matching providers and transportation requests across the transportation matching system 102 as a whole. By weighting the directional filter, in some embodiments, the threshold deviation angle 406 is not a hard boundary. Rather, the geotemporal destination system 104 weights the directional filter such that the more a deviation angle associated with a transportation request exceeds the threshold deviation angle 406, the less likely the geotemporal destination system 104 is to select the provider device 112 to service the transportation requests.

Thus, based on utilizing these weights, in some cases, the geotemporal destination system 104 provides transportation requests even though locations of the transportation requests are outside of the threshold deviation angle 406 (such as the location 408*c*). Based on determining that the provider device 112 services the transportation request associated with the location 408*c*, the geotemporal destination system 104 adjusts or modifies the threshold deviation angle 406 to increase its size for subsequent sessions of the destination mode. Indeed, because the geotemporal destination system 104 determines that the provider device 112 indicated a tendency to service transportation requests with a particular margin (e.g., 3 degrees or 5 degrees) of the threshold deviation angle 406, the geotemporal destination system 104 determines to increase the threshold deviation angle 406 by the margin.

Indeed, as mentioned above, the geotemporal destination system 104 can modify or adjust a threshold deviation angle. In particular, the geotemporal destination system 104 can modify a threshold deviation angle on the fly in real time during a single destination mode session and/or modify a (or generate a new) threshold deviation angle for successive destination mode sessions for the provider device 112. FIG. 4B illustrates a threshold deviation angle 414 (represented by the symbol θ for the provider device 112) that is larger than the threshold deviation angle 406 associated with the same provider device 112 in accordance with one or embodiments.

The geotemporal destination system 104 modifies the threshold angle 406 to generate the threshold deviation angle 414 based on changes in provider device location, time of day, and/or provider preferences. As shown in FIG. 4B, for instance, the geotemporal destination system 104 determines that the provider device location 410 is different from the provider device location 402. In addition, the geotemporal destination system 104 determines that the time of day for the provider device 112 traveling from the provider device location 410 to the target destination 412 is different (e.g., has fewer transportation requests) than the time of day associated with FIG. 4A where the provider device traveled from the provider device location 402 to the target destination 404. Further, the geotemporal destination system 104 determines a change in provider preferences by, for example, determining that the provider device 112 services the transportation request associated with the location 408*c* outside of the threshold deviation angle 406.

Based on identifying or determining the above changes, the geotemporal destination system 104 generates the threshold deviation angle 414 having a larger angle than the threshold deviation angle 406. In addition, the geotemporal destination system 104 determines deviation angles associated with the locations 416*a* and 416*b*. As shown in FIG. 4B, the geotemporal destination system 104 determines that the deviation angles associated with the locations 416*a* and 416*b* are within the threshold deviation angle 414, and the geotemporal destination system 104 therefore provides the corresponding transportation requests to the provider device 112.

In one or more embodiments, the geotemporal destination system 104 dynamically searches for and provides transportation requests. More specifically, as the geotemporal destination system 104 determines changes to the provider device location 410 while the provider device 112 travels toward the target destination 412, the geotemporal destination system 102 surfaces different transportation requests to the provider device 112. For example, the geotemporal destination system 104 applies a directional filter and provides a first set of transportation requests to the provider device 112 based on a first provider device location (e.g., the provider device location 410 of FIG. 4B), and the geotemporal destination system 104 applies the directional filter and provides a second set of transportation requests to the provider device 112 based on a second provider device location (e.g., a location closer to the target destination 412).

In some embodiments, the geotemporal destination system 104 provides a threshold deviation angle (e.g., the threshold deviation angle 414) for display on the provider device 112. In particular, the geotemporal destination system 104 causes the provider device 112 to present a portrayal or a visual representation of the threshold deviation angle 414 within a graphical map interface (e.g., with lines as shown in FIG. 4B), thereby representing areas from which the provider device 112 may receive transportation requests. For instance, the geotemporal destination system 104 causes the provider device 112 to display a cone visual representation of the threshold deviation angle 414 (e.g., a cone shape reflected by lines illustrating a range of the threshold deviation angle). In one or more embodiments, the geotemporal destination system 104 constantly updates and maintains the threshold deviation angle 414 as the provider device 112 moves from the provider device location 410. Thus, the provider device 112 displays the threshold deviation angle 414 to indicate, in real time, the areas that do and do not satisfy a directional filter.

Figure 5:
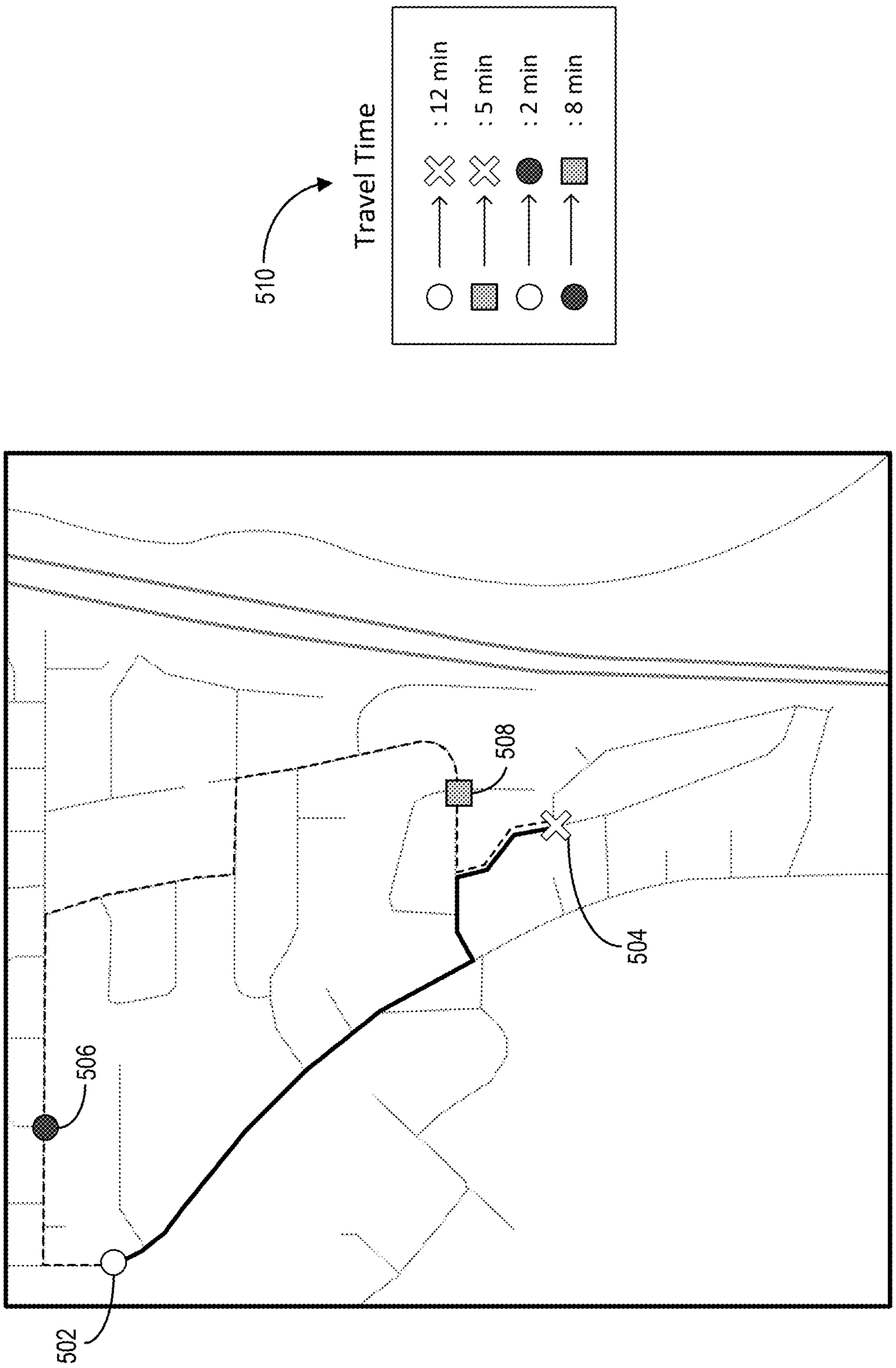
FIG. 5 illustrates an example diagram of utilizing a destination progress metric in accordance with one or more embodiments.

As mentioned above, the geotemporal destination system 104 can select the provider device 112 to service transportation requests based on a destination progress metric. In particular, the geotemporal destination system 104 can determine an amount of progress that the provider device 112 is making toward a target destination and can surface only those transportation requests that satisfy a progress threshold with regard to the destination progress metric. FIG. 5 illustrates determining a destination progress metric for the provider device 112 traveling from the provider device location 502 to the target destination 504 in accordance with one or more embodiments.

As illustrated in FIG. 5, the geotemporal destination system 104 determines travel times for various routes or legs of a route. Indeed, as shown in the table 510, the geotemporal destination system 104 determines that the travel time from the provider device location 502 to the target destination 504 is 12 minutes. In addition, the geotemporal destination system 104 determines that the travel time from the provider device location 502 to a pick-up location 506 (a pick-up location for a transportation request) is 2 minutes, the travel time from the pick-up location 506 to a drop-off location 508 (a drop-off location for the same transportation request) is 8 minutes, and the travel time from the drop-off location 508 to the target destination 504 is 5 minutes. While FIG. 5 illustrates travel time as the destination progress metric, in some embodiments, the geotemporal destination system 104 utilizes travel distance instead. Indeed, the geotemporal destination system 104 can determine the travel distances for the various routes or legs shown in FIG. 5 rather than (or in addition to) determining travel times.

In one or more embodiments, the geotemporal destination system 104 determines a destination progress metric by comparing an amount or measure (e.g., a time or a distance) of reduction in overall travel (time or distance) toward the target destination 504 that is due to servicing the transportation request associated with the pick-up location 506 and the drop-off location 508. For example, the geotemporal destination system 104 determines that, by servicing the transportation request, the provider device 112 will be delayed beyond the original 12 minute travel time to the target destination 504, but will still make a certain amount of progress toward the target destination 504 while traveling the routes associated with servicing the transportation request (e.g., from the provider device location 502 to the pick-up location 506, from the pick-up location 506 to the drop-off location 508, and from the drop-off location 508 to the target destination 504).

In one or more embodiments, the geotemporal destination system 104 determines the destination progress metric as a difference between the travel time (or distance) from the provider device location 502 to the target destination (12 minutes) and the travel time (or distance) from the drop-off location 508 to the target destination (5 minutes). In addition, the geotemporal destination system 104 compares the destination progress metric with a progress threshold such as a threshold indicating that, for every 10 unit of overall travel (e.g., every minute or every mile), the provider device 112 must get 3 units closer to the target destination 504—i.e., the reduction in travel to the target destination 504 must be 30% of overall travel.

To illustrate, the geotemporal destination system 104 compares a destination progress metric with a progress threshold in accordance with the following:

TravelTime(from ProviderDeviceLocation to TargetDestination)−TravelTime(from DropOffLocation to TargetDestination)>0.3*TravelTime(from ProviderDeviceLocation to PickUpLocation to DropOffLocation).

Upon determining that the transportation request satisfies the progress threshold, the geotemporal destination system 104 selects the provider device 112 to service the transportation request and provides the transportation request to the provider device 112. As shown in FIG. 5, for instance, the geotemporal destination system 104 determines that 12 minutes−5 minutes is greater than 0.3*(2 minutes+8 minutes), and the transportation request therefore satisfies the progress threshold.

Figure 6:
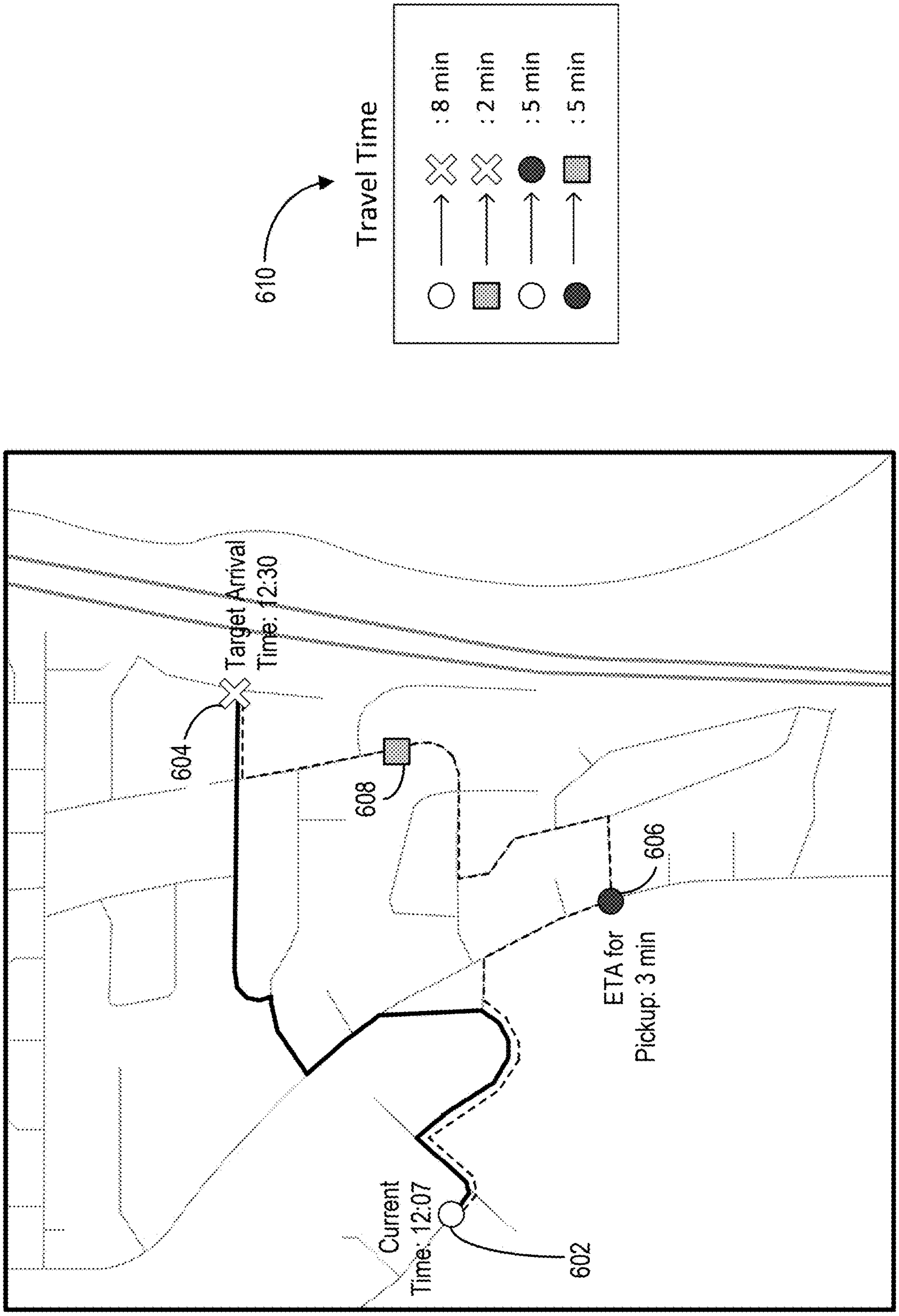
FIG. 6 illustrates an example diagram of utilizing an arrival time filter in accordance with one or more embodiments.

As mentioned above, the geotemporal destination system 104 can utilize an arrival time filter in addition (or alternatively) to utilizing a directional filter and/or a progress threshold. In particular, the geotemporal destination system 104 can filter and/or identify transportation requests based on whether the provider device 112 can service the transportation requests and still arrive at a target destination by a target arrival time. FIG. 6 illustrates utilizing an arrival time filter in accordance with one or more embodiments.

As shown in FIG. 6, the geotemporal destination system 104 determines travel times associated with various routes associated with a transportation request. In particular, the geotemporal destination system 104 identifies potential routes between various locations (e.g., from the provider device location 602 to the target destination 604 or from the pick-up location 606 to the drop-off location 608), determines travel times associated with the potential routes, and selects a shortest potential route (e.g., a route with a shortest travel time) for each one. For example, as indicated by the table 610, the geotemporal destination system 104 determines that the travel time from the provider device location 602 to the target destination is 8 minutes, the travel time from the provider device location 602 to the pick-up location 606 is 5 minutes, the travel time from the pick-up location 606 to the drop-off location is 5 minutes, and the travel time from the drop-off location 608 to the target destination 604 is 2 minutes.

In addition, the geotemporal destination system 104 determines a current time of 12:07 and a target arrival time to the target destination 604 of 12:30. Further, the geotemporal destination system 104 generates an estimate of time it will take to pick up a requester ("ETA for pickup") that includes an estimated wait time at the pick-up location 606 and/or a time for the requester to load into a transportation vehicle associated with the provider device 112. As shown, the ETA for pickup in FIG. 6 is 3 minutes. Based on the travel times shown in the table 610 as well as the other timing information shown in FIG. 6, the geotemporal destination system 104 determines whether the provider device 112 will arrive at the target destination 604 at (or within a arrival time buffer of) the target arrival time.

In some embodiments, the geotemporal destination system 104 determines whether the transportation request associated with the pick-up location 606 and the drop-off location 608 satisfies the arrival time filter in accordance with:

$$\text{Current Time} + 1.2 * (\mathit{TravelTime}(\text{from } \mathit{ProviderDeviceLocation} \text{ to } \mathit{PickUpLocation}) + \mathit{TravelTime}(\text{from } \mathit{PickUpLocation} \text{ to } \mathit{DropOffLocation}) + \mathit{ETA} \text{ for Pickup} + \mathit{TravelTime}(\text{from } \mathit{DropOffLocation} \text{ to } \mathit{TargetDestination})) < \mathit{TargetArrivalTime}.$$

As indicated by the above formula, the geotemporal destination system 104 sums the current time with 1.2 times a total duration of time for servicing the transportation request. In some embodiments, the geotemporal destination system 104 utilizes a different multiplier value (e.g., an arrival time buffer) instead of 1.2 (e.g., 1, 1.3, 1.5, or 2.0) to allow for no time margin, a larger time margin, or a smaller time margin. The geotemporal destination system 104 further determines if the sum is less than a target arrival time to indicate whether the transportation request satisfies an arrival time filter.

To illustrate from FIG. 6, the geotemporal destination system 104 sums the current time of 12:07 with 1.2 times the travel time from the provider device location 602 to the pick-up location 606 (5 minutes) plus the travel time from the pick-up location 606 to the drop-off location 608 (5 minutes) plus the ETA for pickup (3 minutes) plus the travel time from the drop-off location 608 to the target destination 604 (2 minutes). Indeed, the geotemporal destination system 104 generates a predicted arrival time based on the sum of 12:07+15 minutes=12:22. The geotemporal destination system 104 further compares the predicted arrival time of 12:22 with the target arrival time of 12:30. Based on determining that the predicted arrival time is less than (or equal to) the target arrival time, the geotemporal destination system 104 determines that the transportation request satisfies the arrival time filter.

In some embodiments, the geotemporal destination system 104 utilizes a default target arrival time for an arrival time filter. In particular, the geotemporal destination system 104 determines a default target arrival time based on comparing the travel time from the provider device location 602 to the target destination 604 with a minimum arrival time. A minimum arrival time is based on a rounding-up of the travel time from the provider device location 602 to the target destination 604. For example, the geotemporal destination system 104 utilizes a default target arrival time given by:

$$\mathit{DefaultTargetArrivalTime} = \mathit{HigherOf}(\mathit{MinArriveByTime}, 2.0 * \mathit{TravelTime}(\text{from } \mathit{ProviderDeviceLocation} \text{ to } \mathit{TargetDestination})$$

where $$\mathit{MinArriveByTime} = \mathit{RoundUpToNearest}10\mathit{MinuteMark}(1.3 * \mathit{TravelTime}(\text{from } \mathit{ProviderDeviceLocation} \text{ to } \mathit{TargetDestination}.$$

In one or more embodiments, the geotemporal destination system 104 utilizes an arrival time filter to progressively restrict or progressively filter transportation requests. To elaborate, when an arrival time is farther in the future (e.g., beyond a threshold duration of time from a current time), the geotemporal destination system 104 utilizes less stringent requirements on timing for transportation requests, provided the transportation requests still satisfy a threshold probability of allowing the provider device 112 to arrive at the target destination 604 by that target arrival time. As the arrival time gets closer, the geotemporal destination system 104 utilizes more stringent arrival time filter rules (e.g., a higher threshold probability) to ensure that the provider device 112 arrives at the target destination 604 by the target arrival time even after servicing surfaced transportation requests.

Figure 7:
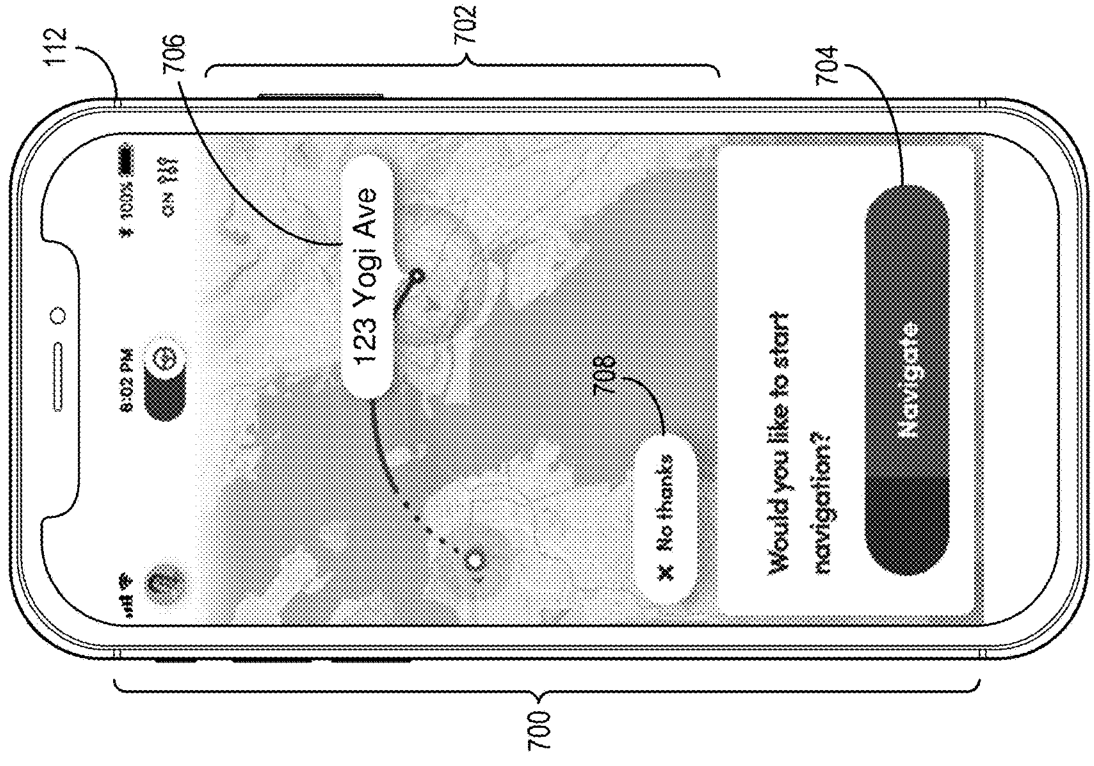
FIG. 7 illustrates an example destination mode interface in accordance with one or more embodiments.

As mentioned, the geotemporal destination system 104 can generate and provide a user interface for display on the provider device 112. In particular, the geotemporal destination system 104 can generate and provide a destination mode interface in response to receiving an indication from the provider device 112 to utilize the destination transportation matching mode. FIG. 7 illustrates a destination mode interface 700 displayed on the provider device 112 in accordance with one or more embodiments.

As illustrated in FIG. 7, the provider device 112 displays a graphical map 702 within the destination mode interface 700. In addition, the provider device 112 displays a target destination indicator 706 and a navigate option 704 that is selectable to trigger the geotemporal destination system 104 to apply one or more filters to identify transportation requests for the provider device 112. As shown, the geotemporal destination system 104 automatically (e.g., without further user interaction) begins navigation upon expiration of a timer indicated by the darker-colored portion of the navigation option 704 that grows until the navigation option 704 is completely transitioned to the new color and the timer expires. Further, the provider device 112 displays a cancel option 708 that is selectable to stop the identification of transportation requests while navigating to the indicated target destination in destination mode.

Figure 8:
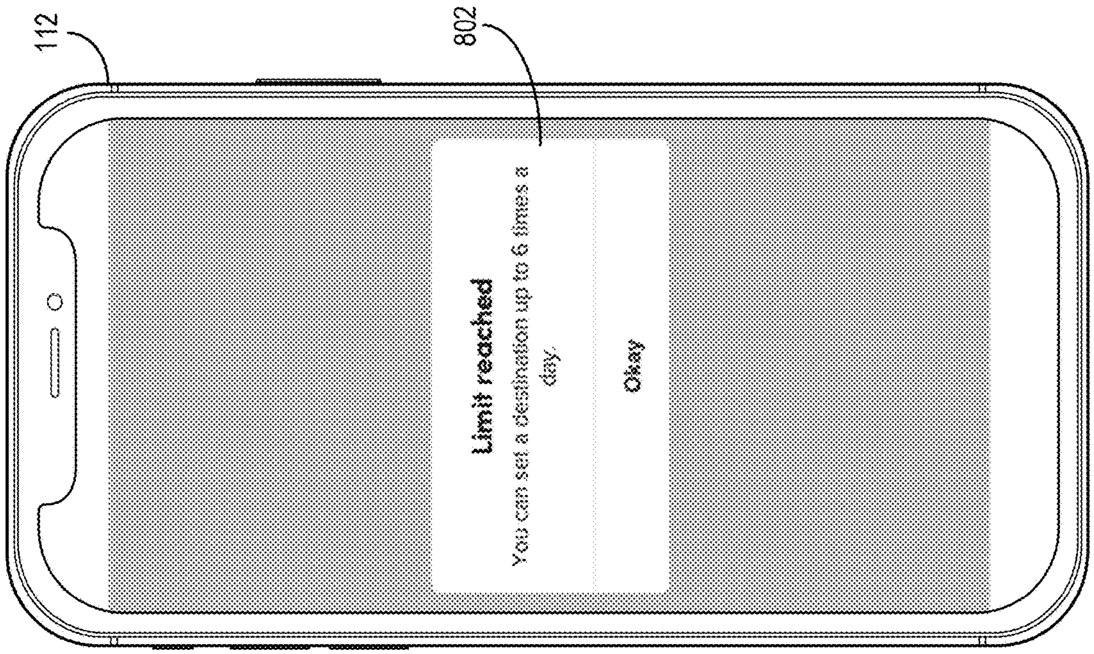
FIG. 8 illustrates an example user interface displaying a notification in accordance with one or more embodiments.

As also mentioned, the geotemporal destination system 104 can determine a number of tokens associated with the provider device 112 (or a provider account associated with the provider device 112). In particular, the geotemporal destination system 104 can determine whether the provider device 112 is allowed to utilize the destination mode based on a number of tokens associated with the provider device 112. FIG. 8 illustrates the provider device 112 displaying a limit reached notification 802 in accordance with one or more embodiments.

Indeed, based on determining that the provider device 112 has no tokens remaining, the geotemporal destination system 104 provides the limit reached notification 802 for display on the provider device 112. As described, the geotemporal destination system 104 enables the provider device 112 to utilize the destination mode for a set number of sessions or uses within a given time period. For example, the geotemporal destination system 104 allots the provider device 112 6 uses of the destination mode per day—i.e., the geotemporal destination system 104 assigns 6 tokens to the provider device 112 per day. The geotemporal destination system 104 further reduces the number of tokens for the provider device 112 with each new use of the destination mode (e.g., each time the geotemporal destination system 104 receives a new target destination and/or a change to a filter type while in destination mode).

Figure 9:
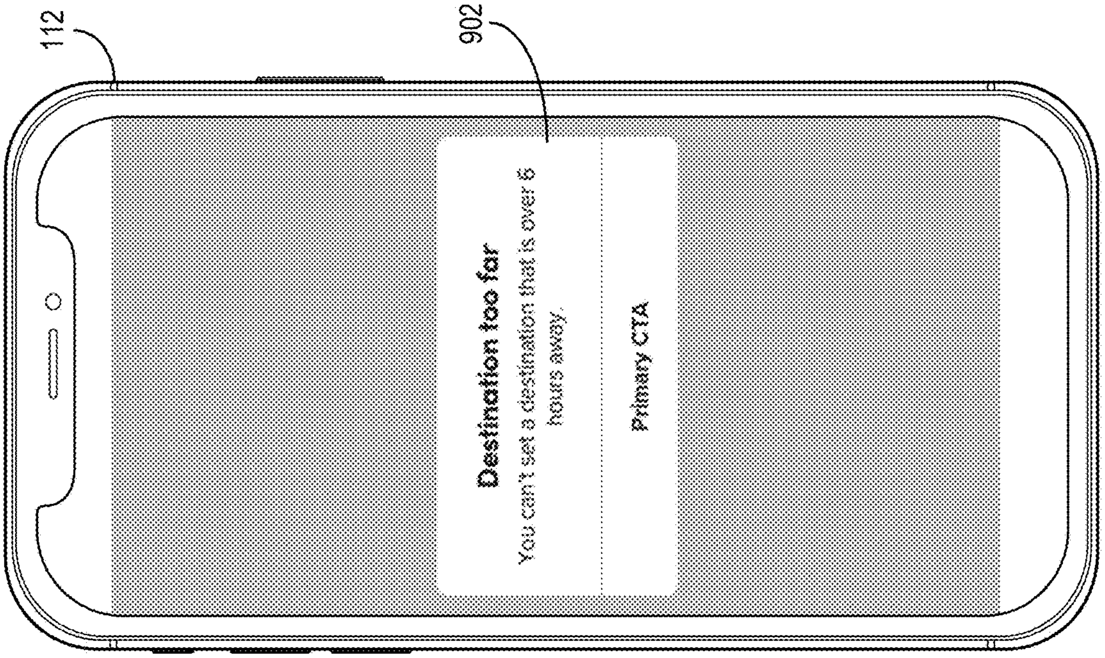
FIG. 9 illustrates an example user interface displaying a notification in accordance with one or more embodiments.

In addition to utilizing a number of tokens to determine authorization for the provider device 112, the geotemporal destination system 104 can further determine a threshold distance for the provider device 112. In particular, the geotemporal destination system 104 can determine a threshold distance (or a threshold time) that the provider device 112 can travel to an indicated target destination while in destination mode to receive transportation requests along the route. FIG. 9 illustrates the provider device 112 displaying an excessive destination notification 902 in accordance with one or more embodiments.

As illustrated in FIG. 9, the provider device 112 displays the excessive destination notification 902 as a result of a target destination that exceeds a target destination threshold (e.g., a distance threshold or a time threshold). Indeed, based on receiving a target destination from the provider device 112, the geotemporal destination system 104 determines a distance (or a travel time) for navigating to the target destination. Upon determining that the target destination exceeds the threshold, the geotemporal destination system 104 generates and provides the excessive destination notification 902 for display on the provider device 112. The geotemporal destination system 104 further prevents the provider device 112 from utilizing the destination mode until receiving a new target destination. In some embodiments, the geotemporal destination system 104 utilizes a target destination threshold of 6 hours, as shown in FIG. 9.

Figure 10:
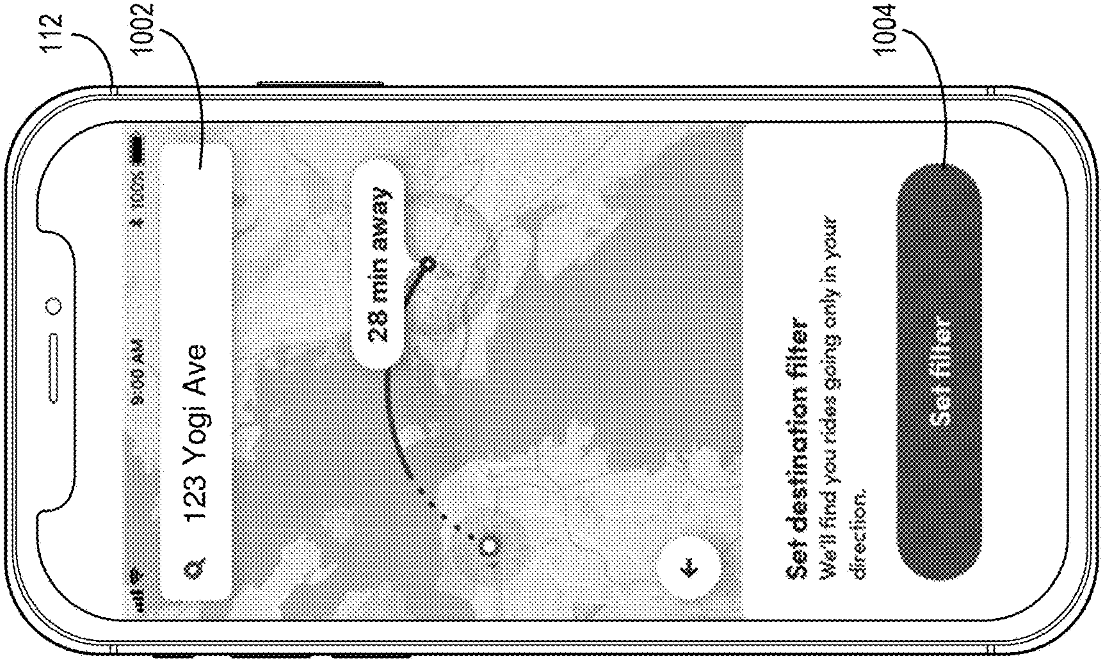
FIG. 10 illustrates an example user interface for entering a target destination in accordance with one or more embodiments.

As mentioned, the geotemporal destination system 104 can receive an indication to apply a directional filter from the provider device 112. In particular, the geotemporal destination system 104 can receive an indication of a target destination and a selection of a filter option to trigger the geotemporal destination system 104 to begin filtering transportation requests based on the target destination. FIG. 10 illustrates the provider device 112 displaying a target destination input field 1002 and a set filter option 1004 within a destination mode interface in accordance with one or more embodiments.

As shown in FIG. 10, the provider device 112 displays a target destination input field 1002 whereby a provider can input a target destination associated with a destination mode session. Indeed, the provider device 112 can receive user input from a provider to enter a target destination with a particular address. In some embodiments, the provider device 112 receives input for a target destination in the form of a pin drop, address, or a selection within a graphical map. In any event, the provider device 112 receives the input for the target destination and provides an indication of the target destination to the geotemporal destination system 104.

In one or more embodiments, the provider device 112 provides the indication for the target destination based on a user input to select the set filter option 1004. For example, the provider device 112 receives or detects a provider selection of the set filter option 1004, whereupon the provider device 112 provides an indication of the target destination to the geotemporal destination system 104, and the geotemporal destination system 104 generates a directional filter for the provider device 112 by determining a threshold deviation angle based various factors, as described above.

Figure 11:
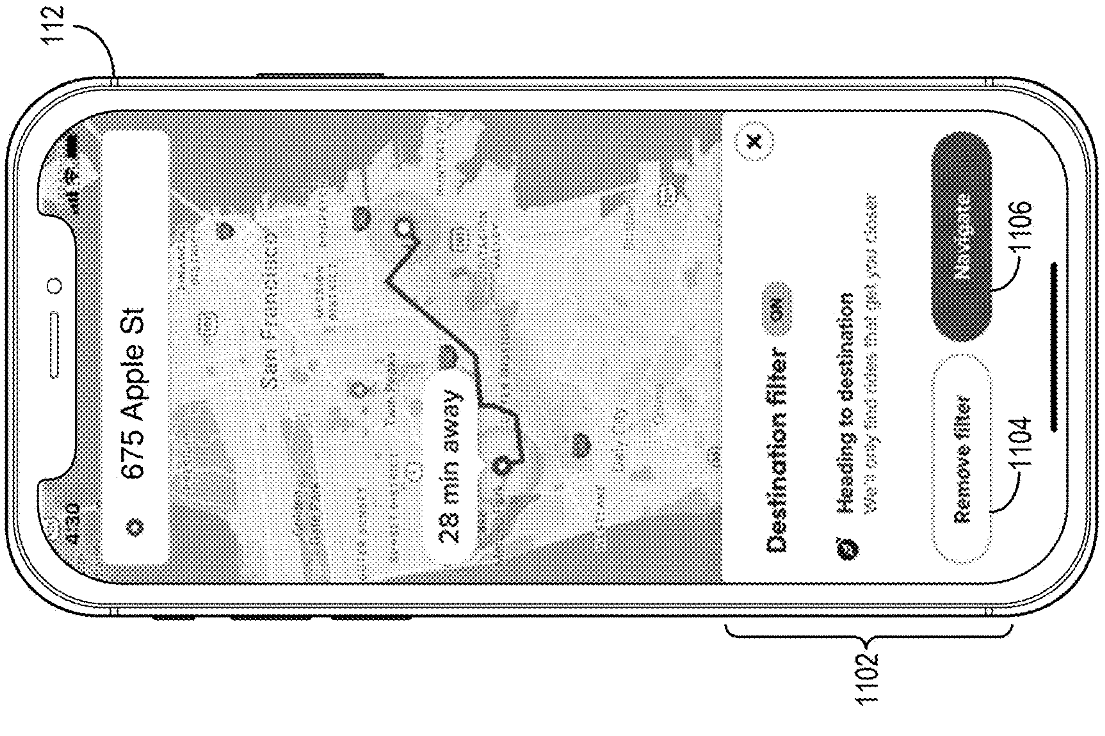
FIG. 11 illustrates an example user interface for utilizing a directional filter within a destination mode interface in accordance with one or more embodiments.

As mentioned above, the geotemporal destination system 104 can receive an indication from the provider device 112 to begin navigating to a target destination. In particular, the geotemporal destination system 104 can receive an indication to begin filtering transportation requests for the provider device 112 navigating to a target destination. FIG. 11 illustrates the provider device 112 displaying a filter window 1102 of a destination mode interface, where the filter window 1102 includes a remove filter option 1104 and a navigate option 1106 in accordance with one or more embodiments.

As shown in FIG. 11, the provider device 112 displays a filter window 1102 that includes various information about an applied filter for the destination mode session. For example, the filter window 1102 indicates a filter type associated with the destination mode session (e.g., "Destination filter") and an indication of whether the filter is engaged (or "on"). The filter window 1102 further includes selectable options (e.g., the remove filter option 1104 and the navigate option 1106) whereby the provider device 112 receives provider input to remove an applied filter (the remove filter option 1104) or indicate to navigate to the target destination (the navigate option 1106). Upon receiving an indication that a provider has selected the navigate option 1106, the geotemporal destination system 104 begins filtering transportation requests based on the filter.

Figure 12:
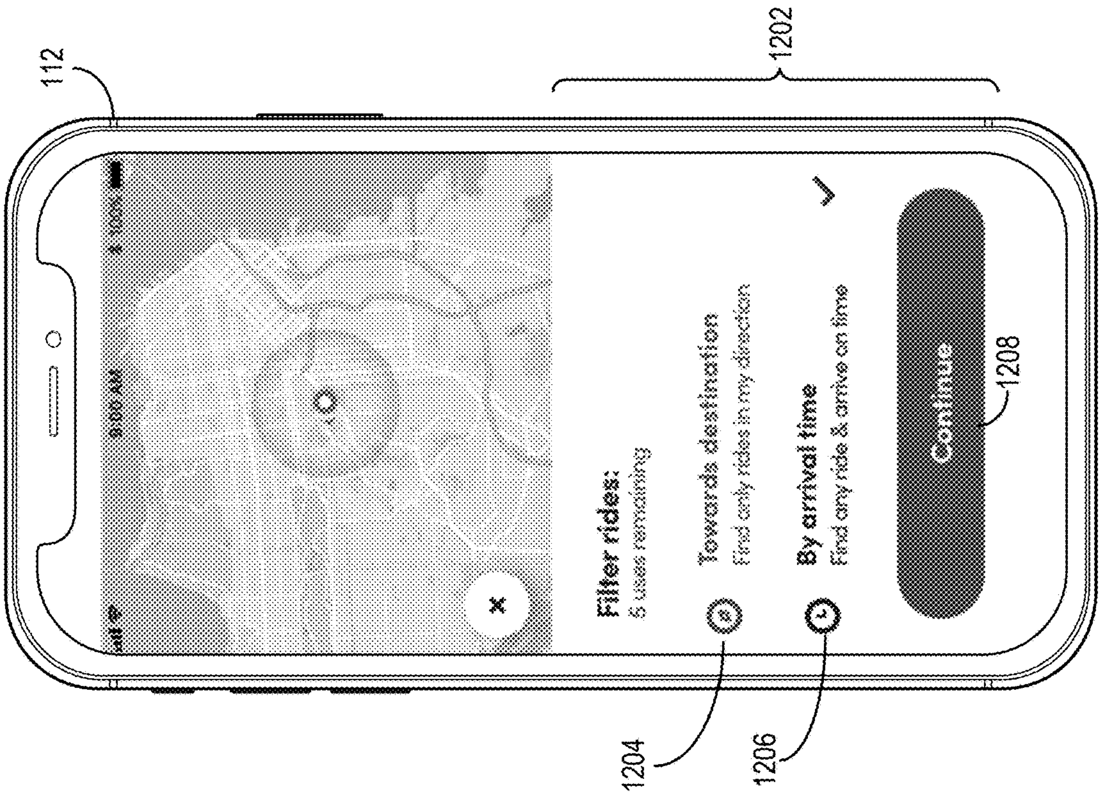
FIG. 12 illustrates an example user interface for selecting a filter type in according with one or more embodiments.

As mentioned, the geotemporal destination system 104 can receive an indication of a filter type from the provider device 112. In particular, the geotemporal destination system 104 can receive an indication of a directional filter and/or an arrival time filter to utilize for identifying transportation requests. FIG. 12 illustrates the provider device 112 displaying a filter type window 1202 within the destination mode interface, where the filter type window 1202 includes a directional filter option 1204, an arrival time filter option 1206, and a continue option 1208 in accordance with one or more embodiments.

As shown in FIG. 12, the filter type window 1202 indicates that the provider device 112 is currently utilizing an arrival time filter. Based on receiving a selection of the directional filter option 1204, however, the provider device 112 can switch to utilizing the directional filter. Indeed, in some embodiments, the geotemporal destination system 104 applies only one of the directional filter or the arrival time filter for the provider device 112. In other embodiments, the geotemporal destination system 104 applies both the directional filter and the arrival time filter. Based on receiving an indication that a user selects the directional filter option 1204, the geotemporal destination system 104 either switches to utilizing the directional filter or adds the directional filter to the arrival time filter. Based on receiving an indication of a selection of the continue option 1208, the geotemporal destination system 104 applies the selected filter(s) and identifies transportation requests accordingly.

As further shown, the filter type window 1202 can further present a number of tokens (e.g., "5 uses remaining") associated with the provider device 112. For example, the filter type window 1202 can present the number of tokens using a particular font color (e.g., purple). In some embodiments, the provider device 112 can present the number of tokens using a second different color (e.g., red) when the number of tokens is at or below a threshold number (e.g., 1) of tokens remaining. Thus, the provider device 112 can indicate when the number of tokens is nearly exhausted.

Figure 13:
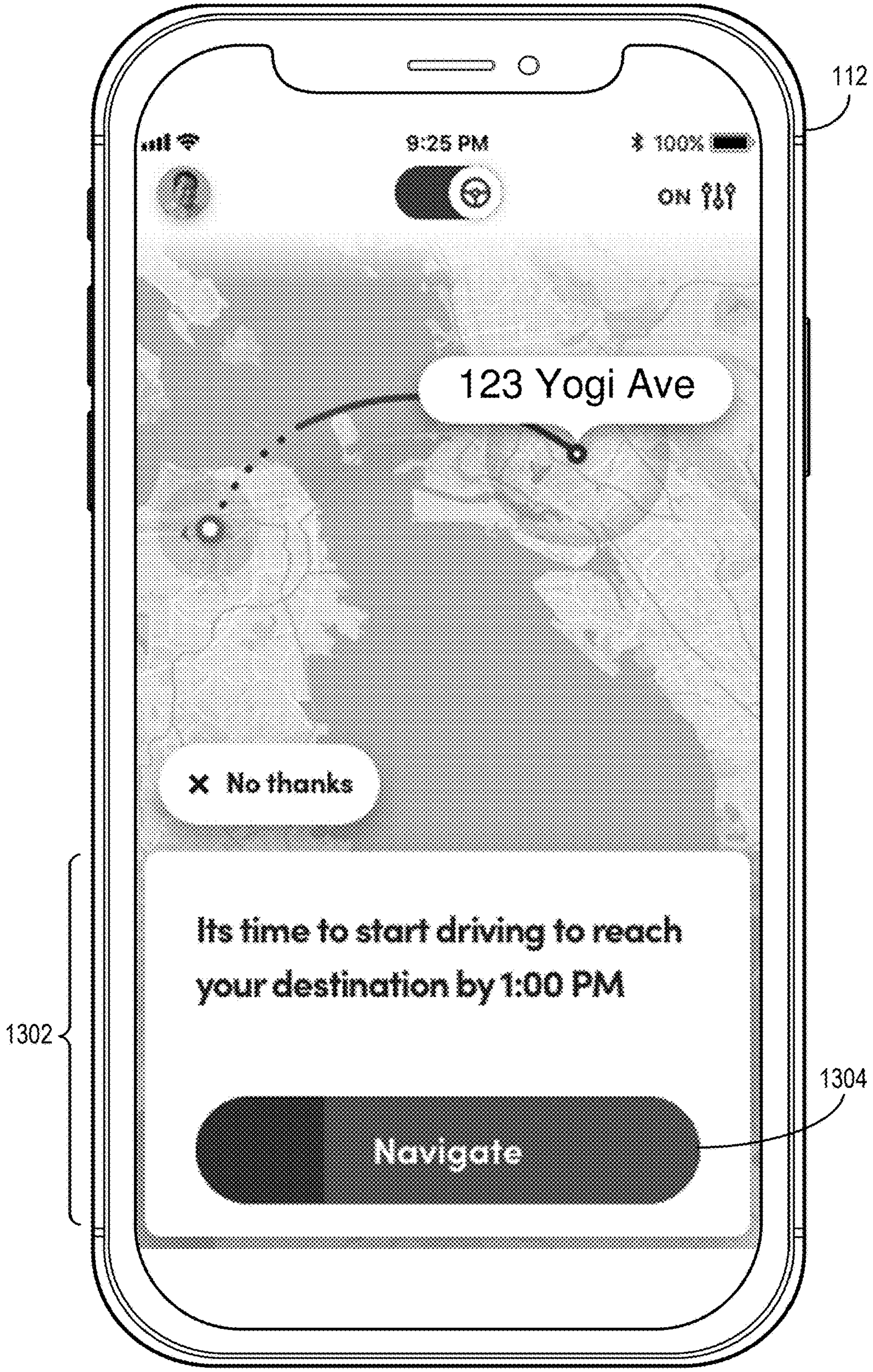
FIG. 13 illustrates an example destination mode interface for utilizing an arrival time filter in accordance with one or more embodiments.

As mentioned, the geotemporal destination system 104 can utilize an arrival time filter for identifying transportation requests. FIG. 13 illustrates the provider device 112 displaying an arrival time indication 1302 along with a navigate option 1304 in accordance with one or more embodiments.

As shown in FIG. 13, the provider device 112 displays an indication prompting a provider to begin traveling toward a target destination based on a target arrival time. Indeed, the geotemporal destination system 104 can determine when the provider device 112 needs to depart from a provider device location to arrive at a target destination by a target arrival time. In some embodiments, the geotemporal destination system 104 provides the arrival time indication 1302 for display on the provider device 112 to prompt the provider associated with the provider device 112 to begin traveling. For example, the geotemporal destination system 104 determines a duration of time associated with servicing a particular transportation request and provides the arrival time indication 1302 based on determining a departure time that would enable the provider device 112 to service the transportation request and still arrive at the target destination at the target arrival time.

Figure 14:
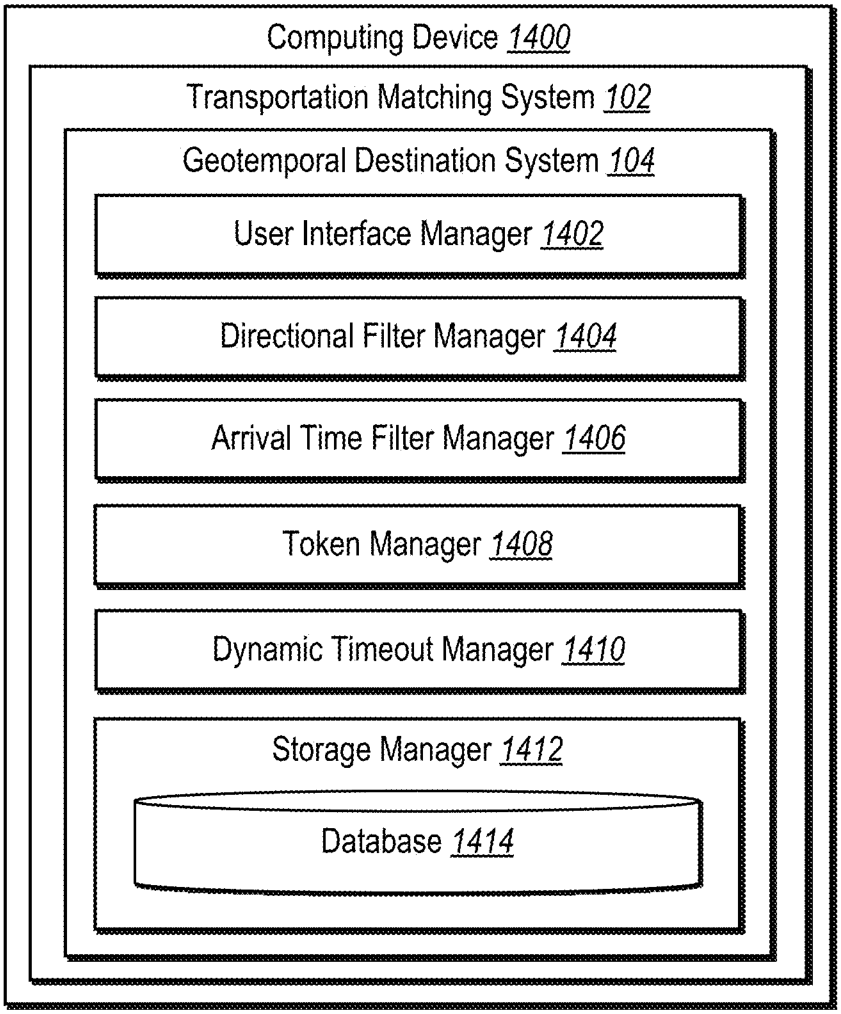
FIG. 14 illustrates a block diagram of an example computing device including various components of a geotemporal destination system in accordance with one or more embodiments.

Looking now to FIG. 14, additional detail will be provided regarding components and capabilities of the geotemporal destination system 104. Specifically, FIG. 14 illustrates an example schematic diagram of the geotemporal destination system 104 on an example computing device 1400 (e.g., one or more of the requester devices 108*a*-108*n*, the provider device 112, and/or the server(s) 106). As shown in FIG. 14, the geotemporal destination system 104 may include a user interface manager 1402, a directional filter manager 1404, an arrival time filter manager 1406, a token manager 1408, a dynamic timeout manager 1410, and a storage manager 1412.

As mentioned, the geotemporal destination system 104 includes a user interface manager 1402. In particular, the user interface manager 1402 can manage, maintain, provide, display, cause to be displayed, present, render, or identify information pertaining to a user interface such as a destination mode interface. For example, the user interface manager 1402 can provide a destination mode interface for display on a provider device, such as those described above. In addition, the user interface manager 1402 can receive user input (or indications of user input) such as a selection of a filter type and can present visual indicators for transportation requests that satisfy the filter of the filter type. Further, the user interface manager 1402 can communicate with the directional filter manager 1404 and/or the arrival time filter manager 1406 to present or display information pertaining to transportation requests that satisfy one or more filters.

As shown, the geotemporal destination system 104 further includes a directional filter manager 1404. In particular, the directional filter manager 1404 manages, maintains, applies, utilizes, learns, generates, modifies, adjusts, or otherwise determines a directional filter for identifying transportation requests. For example, the directional filter manager 1404 generates a threshold deviation angle for a directional filter to identify and filter out transportation requests based on the threshold deviation angle. Indeed, the directional filter manager 1404 identifies transportation requests that satisfy the threshold deviation angle to provide to a provider device utilizing a destination mode.

Additionally, the geotemporal destination system 104 includes an arrival time filter manager 1406. In particular, the arrival time filter manager 1406 manages, maintains, applies, utilizes, learns, generates, modifies, adjusts, or otherwise determines an arrival time filter for identifying transportation requests. For example, the arrival time filter manager 1406 determines durations of time associated with transportation requests and further determines whether a provider device can service the transportation requests and still arrive at a target destination by a target arrival time. Indeed, the arrival time filter manager 1406 identifies transportation requests that satisfy an arrival time filter to provide to a provider device.

Further, the geotemporal destination system 104 includes a token manager 1408. In particular, the token manager 1408 manages, maintains, determines, receives, or otherwise identifies numbers of tokens associated with provider devices (or provider accounts). The token manager 1408 further identifies various user inputs such as requests to utilize a destination mode, a request to change a filter type, a request to change a target destination, and a request to change a target arrival time. Based on receiving one of these user inputs from a provider device, the token manager 1408 reduces (e.g., decrements) a number of tokens associated with the provider device. Indeed, the token manager 1408 can assign a provider device a default number of tokens (e.g., 6 or 2) for a given time period (e.g., a day), and if the token manager 1408 determines that a provider device has no more tokens remaining, the token manager 1408 communicates with the user interface manager 1402 to provide a limit reached notification.

As further shown, the geotemporal destination system 104 includes a dynamic timeout manager 1410. In particular, the dynamic timeout manager 1410 manages, determines, or otherwise identifies session timeouts of provider device utilizing the destination transportation matching mode. For example, the dynamic timeout manager 1410 determines one or more timeout criteria associated with a provider device utilizing a destination mode, as described above. Indeed, the dynamic timeout manager 1410 determines whether a provider device is in an area with fewer than a threshold number of transportation requests and/or whether the provider device is making progress toward a target destination.

The geotemporal destination system 104 further includes a storage manager 1412. In particular, the storage manager 1412 manages, maintains, stores, accesses, retrieves, receives, provides, and or otherwise identifies information within a database 1414. For example, the storage manager 1412 stores, accesses, and communicates other components of the geotemporal destination system 104 rules, algorithms, or formulas for a directional filter and/or an arrival time filter within the database 1414. In some embodiments, the storage manager 1412 further stores and accesses provider device information within the database 1414, such as provider account information, provider device locations, target destinations, target arrival times, current times, and travel times associated with different routes, as described above.

In one or more embodiments, each of the components of the geotemporal destination system 104 are in communication with one another using any suitable communication technologies. Additionally, the components of the geotemporal destination system 104 can be in communication with one or more other devices including one or more client devices described above. It will be recognized that although the components of the geotemporal destination system 104 are shown to be separate in FIG. 14, any of the subcomponents may be combined into fewer components, such as into a single component, or divided into more components as may serve a particular implementation. Furthermore, although the components of FIG. 14 are described in connection with the geotemporal destination system 104, at least some of the components for performing operations in conjunction with the geotemporal destination system 104 described herein may be implemented on other devices within the environment.

The components of the geotemporal destination system 104 can include software, hardware, or both. For example, the components of the geotemporal destination system 104 can include one or more instructions stored on a computer-readable storage medium and executable by processors of one or more computing devices (e.g., the computing device 1400). When executed by the one or more processors, the computer-executable instructions of the geotemporal destination system 104 can cause the computing device 1400 to perform the methods described herein. Alternatively, the components of the geotemporal destination system 104 can comprise hardware, such as a special purpose processing device to perform a certain function or group of functions. Additionally or alternatively, the components of the geotemporal destination system 104 can include a combination of computer-executable instructions and hardware.

Furthermore, the components of the geotemporal destination system 104 performing the functions described herein may, for example, be implemented as part of a stand-alone application, as a module of an application, as a plug-in for applications including content management applications, as a library function or functions that may be called by other applications, and/or as a cloud-computing model. Thus, the components of the geotemporal destination system 104 may be implemented as part of a stand-alone application on a personal computing device or a mobile device. Alternatively or additionally, the components of the geotemporal destination system 104 may be implemented in any application that allows creation and delivery of marketing content to users, including, but not limited to, various applications.

FIGS. 1-14, the corresponding text, and the examples provide a number of different systems, methods, and non-transitory computer readable media for identifying and filtering transportation requests based on a directional filter and/or an arrival time filter. In addition to the foregoing, embodiments can also be described in terms of flowcharts comprising acts for accomplishing a particular result. For example, FIG. 15 illustrates a flowchart of an example sequence of acts in accordance with one or more embodiments.

Figure 15:
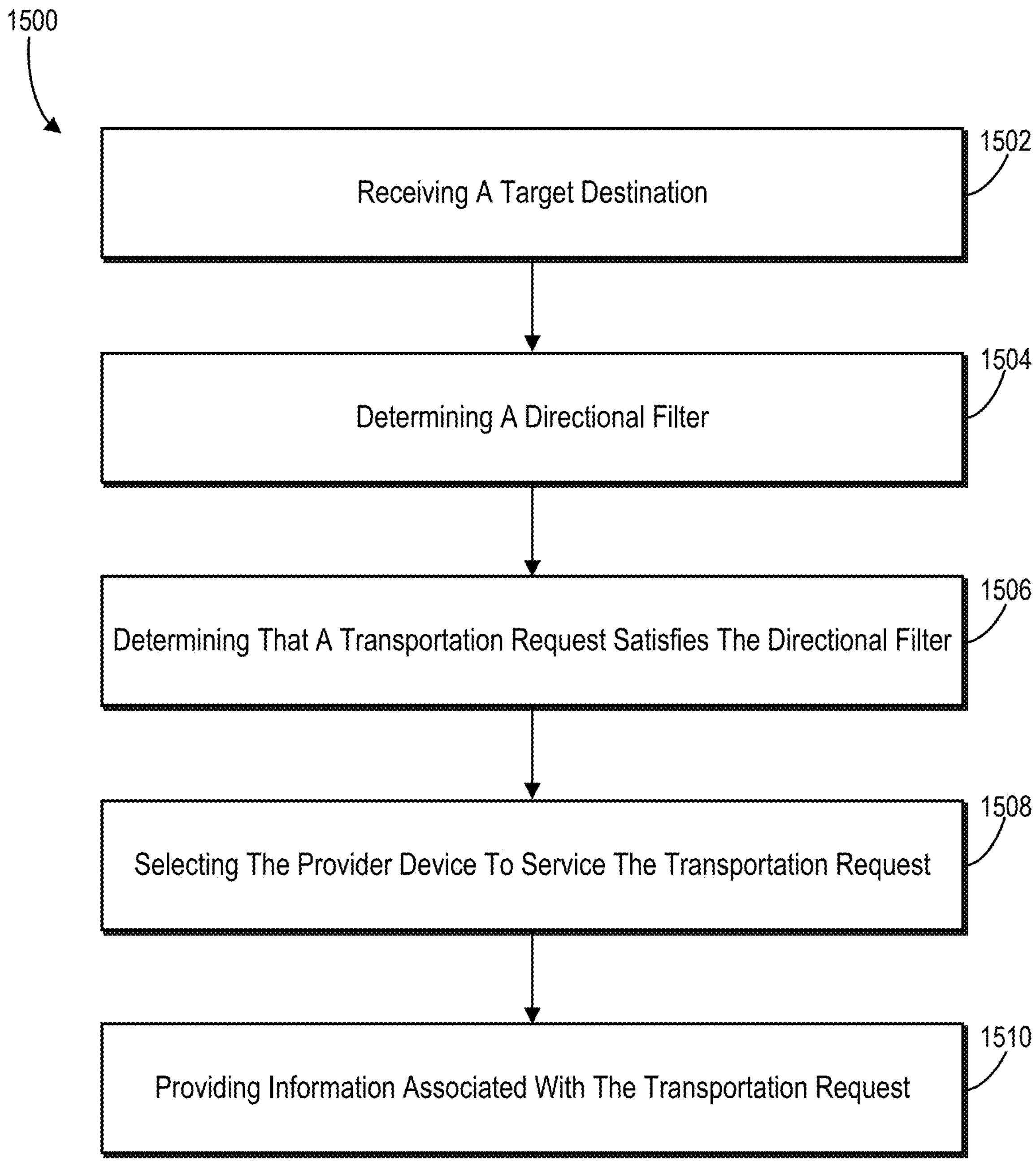
FIG. 15 illustrates an example flow of acts for identifying and filtering transportation requests based on a directional filter and/or an arrival time filter in accordance with one or more embodiments.

While FIG. 15 illustrates acts according to some embodiments, alternative embodiments may omit, add to, reorder, and/or modify any of the acts shown in FIG. 15. The acts of FIG. 15 can be performed as part of a method. Alternatively, a non-transitory computer readable medium can comprise instructions, that when executed by one or more processors, cause a computing device to perform the acts of FIG. 15. In still further embodiments, a system can perform the acts of FIG. 15. Additionally, the acts described herein may be repeated or performed in parallel with one another or in parallel with different instances of the same or other similar acts.

FIG. 15 illustrates an example series of acts 1500 for identifying and filtering transportation requests based on a directional filter and/or an arrival time filter. The series of acts 1500 can include an act 1502 of receiving a target destination. In particular, the act 1502 can involve receiving, from a provider device, a target destination.

As shown, the series of acts 1500 can also include an act 1504 of determining a directional filter. In particular, the act 1504 can involve determining, based on the target destination, a directional filter for selecting transportation requests for the provider device, the directional filter based on a threshold deviation angle, a provider device location, and the target destination. For example, the act 1504 can involve determining a direction from the provider device location to the target destination, and determining the threshold deviation angle from the direction from the provider device location to the target destination based on one or more of the provider device location, provider device preferences, or a time of day.

As further shown, the series of acts 1500 can include an act 1506 of determining that a transportation request satisfies the directional filter. In particular, the act 1506 can involve determining that a transportation request satisfies the directional filter. For example, the act 1506 can involve determining a deviation angle between the direction from the provider device location to the target destination and a direction from the provider device location to a location associated with the transportation request, and determining that the deviation angle is within the threshold deviation angle.

In addition, the series of acts 1500 includes an act 1508 of selecting the provider device to service the transportation request. In particular, the act 1508 can involve, based at least in part on determining that the transportation request satisfies the directional filter, selecting the provider device to service the transportation request.

Further, the series of acts 1500 includes an act 1510 of providing information associated with the transportation request. In particular, the act 1510 can involve providing, for display within an interface presented on the provider device, information associated with the transportation request.

In some embodiments, the series of acts 1500 includes an act of identifying a destination progress metric associated with servicing the transportation request based on a reduction in travel to the target destination for the provider device due to servicing the transportation request. In these or other embodiments, the series of acts 1500 includes an act of, based on determining that the destination progress metric for the transportation request satisfies a progress threshold and further based on the directional filter, selecting the provider device to service the transportation request. The series of acts 1500 can include an act of identifying a target arrival time associated with the target destination and an act of selecting the provider device to service the transportation request based on determining that the transportation request satisfies an arrival time filter associated with the target arrival time.

Determining that the transportation request satisfies the arrival time filter can involve determining a duration of time associated with servicing the transportation request based on the provider device location and determining that the provider device will arrive at the target destination by the arrival time based on servicing the transportation request for the duration of time.

The series of acts 1500 can also include an act of receiving, from the provider device, a request to utilize a destination transportation matching mode for selecting transportation requests to provide to the provider device based on the target destination. In addition, the series of acts 1500 can include an act of determining a number of tokens associated with the provider device and an act of initiating the destination transportation matching mode based on determining that the provider device satisfies a token threshold and an act of reducing the number of tokens based on the request to utilize the destination transportation matching mode.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 16:
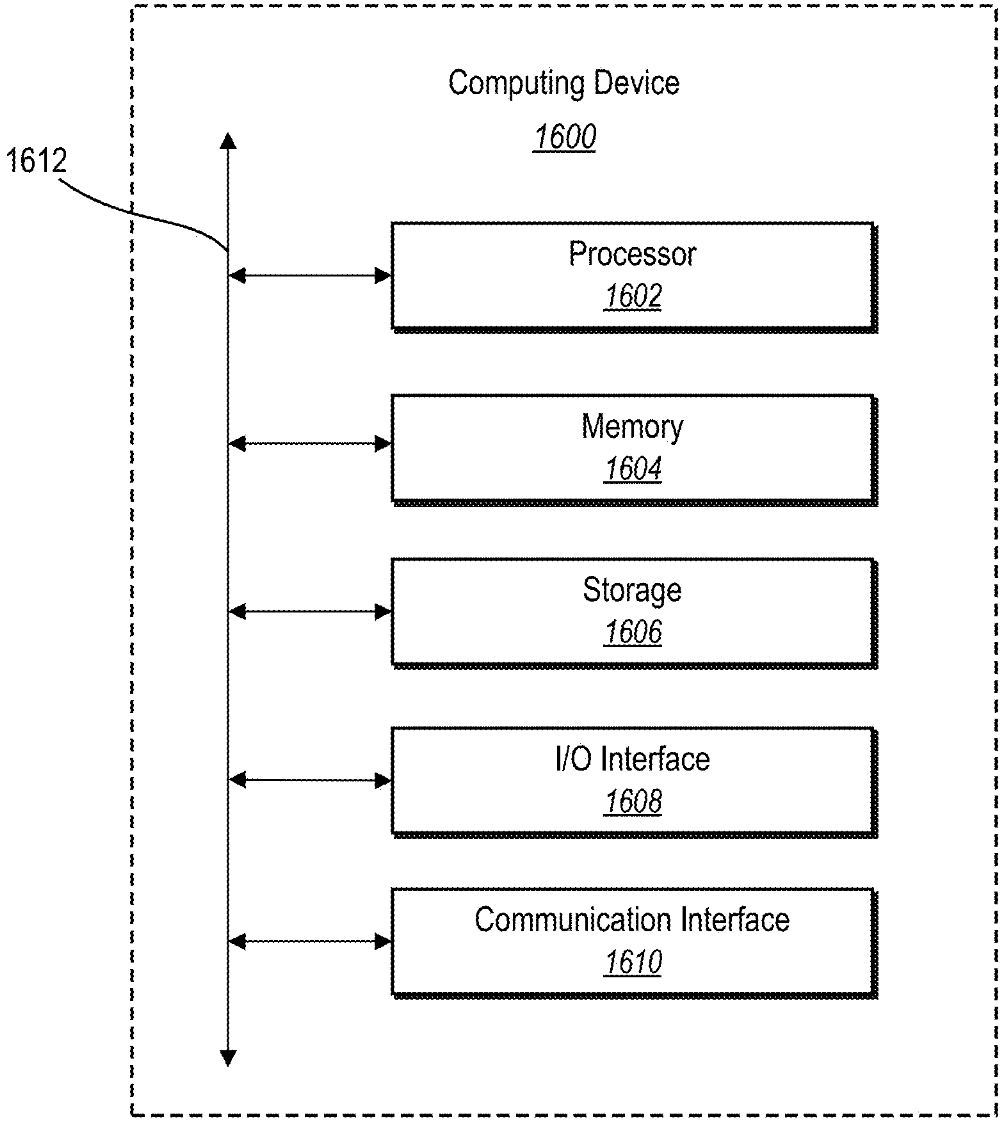
FIG. 16 illustrates a block diagram of a computing device for implementing one or more embodiments of the present disclosure.

FIG. 16 illustrates, in block diagram form, an exemplary computing device 1600 (e.g., the computing device 1400) that may be configured to perform one or more of the processes described above. One will appreciate that the geotemporal destination system 104 can comprise implementations of the computing device 1600, including, but not limited to, the client device 108, the provider device 112, and/or the server(s) 106. As shown by FIG. 16, the computing device can comprise a processor 1602, memory 1604, a storage device 1606, an I/O interface 1608, and a communication interface 1610. In certain embodiments, the computing device 1600 can include fewer or more components than those shown in FIG. 16. Components of computing device 1600 shown in FIG. 16 will now be described in additional detail.

In particular embodiments, processor(s) 1602 includes hardware for executing instructions, such as those making up a computer program. As an example, and not by way of limitation, to execute instructions, processor(s) 1602 may retrieve (or fetch) the instructions from an internal register, an internal cache, memory 1604, or a storage device 1606 and decode and execute them.

The computing device 1600 includes memory 1604, which is coupled to the processor(s) 1602. The memory 1604 may be used for storing data, metadata, and programs for execution by the processor(s). The memory 1604 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1604 may be internal or distributed memory.

The computing device 1600 includes a storage device 1606 includes storage for storing data or instructions. As an example, and not by way of limitation, storage device 1606 can comprise a non-transitory storage medium described above. The storage device 1606 may include a hard disk drive ("HDD"), flash memory, a Universal Serial Bus ("USB") drive or a combination of these or other storage devices.

The computing device 1600 also includes one or more input or output interface 1608 (or "I/O interface 1608"), which are provided to allow a user (e.g., requester or provider) to provide input to (such as user strokes), receive output from, and otherwise transfer data to and from the computing device 1600. These I/O interface 1608 may include a mouse, keypad or a keyboard, a touch screen, camera, optical scanner, network interface, modem, other known I/O devices or a combination of such I/O interface 1608. The touch screen may be activated with a stylus or a finger.

The I/O interface 1608 may include one or more devices for presenting output to a user, including, but not limited to, a graphics engine, a display (e.g., a display screen), one or more output providers (e.g., display providers), one or more audio speakers, and one or more audio providers. In certain embodiments, interface 1608 is configured to provide graphical data to a display for presentation to a user. The graphical data may be representative of one or more graphical user interfaces and/or any other graphical content as may serve a particular implementation.

The computing device 1600 can further include a communication interface 1610. The communication interface 1610 can include hardware, software, or both. The communication interface 1610 can provide one or more interfaces for communication (such as, for example, packet-based communication) between the computing device and one or more other computing devices 1600 or one or more networks. As an example, and not by way of limitation, communication interface 1610 may include a network interface controller ("NIC") or network adapter for communicating with an Ethernet or other wire-based network or a wireless NIC ("WNIC") or wireless adapter for communicating with a wireless network, such as a WI-FI. The computing device 1600 can further include a bus 1612. The bus 1612 can comprise hardware, software, or both that connects components of computing device 1600 to each other.

Figure 17:
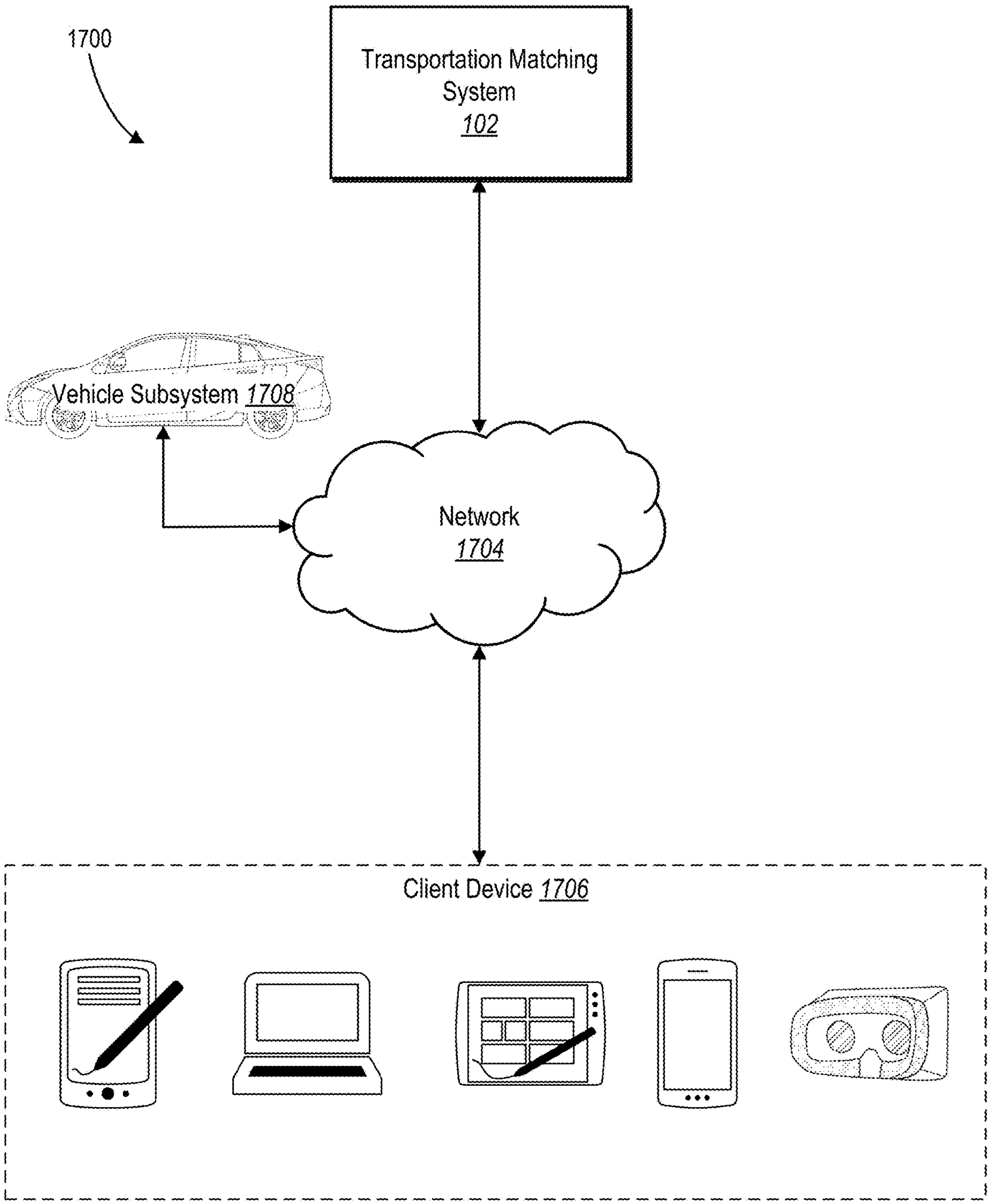
FIG. 17 illustrates an example environment for a transportation matching system in accordance with one or more embodiments.

FIG. 17 illustrates an example network environment 1700 of the transportation matching system 102. The network environment 1700 includes a client device 1706 (e.g., the client device 108), a transportation matching system 102, and a vehicle subsystem 1708 connected to each other by a network 1704. Although FIG. 17 illustrates a particular arrangement of the client device 1706, the transportation matching system 102, the vehicle subsystem 1708, and the network 1704, this disclosure contemplates any suitable arrangement of client device 1706, the transportation matching system 102, the vehicle subsystem 1708, and the network 1704. As an example, and not by way of limitation, two or more of client device 1706, the transportation matching system 102, and the vehicle subsystem 1708 communicate directly, bypassing network 1704. As another example, two or more of client device 1706, the transportation matching system 102, and the vehicle subsystem 1708 may be physically or logically co-located with each other in whole or in part.

Moreover, although FIG. 17 illustrates a particular number of client devices 1706, transportation matching systems 102, vehicle subsystems 1708, and networks 1704, this disclosure contemplates any suitable number of client devices 1706, transportation matching system 102, vehicle subsystems 1708, and networks 1704. As an example, and not by way of limitation, network environment 1700 may include multiple client device 1706, transportation matching system 102, vehicle subsystems 1708, and/or networks 1704.

This disclosure contemplates any suitable network 1704. As an example, and not by way of limitation, one or more portions of network 1704 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1704 may include one or more networks 1704.

Links may connect client device 1706, geotemporal destination system 104, and vehicle subsystem 1708 to network 1704 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1700. One or more first links may differ in one or more respects from one or more second links.

In particular embodiments, the client device 1706 may be an electronic device including hardware, software, or embedded logic components or a combination of two or more such components and capable of carrying out the appropriate functionalities implemented or supported by client device 1706. As an example, and not by way of limitation, a client device 1706 may include any of the computing devices discussed above in relation to FIG. 16. A client device 1706 may enable a network user at the client device 1706 to access network 1704. A client device 1706 may enable its user to communicate with other users at other client devices 1706.

In particular embodiments, the client device 1706 may include a requester application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 1706 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device 1706 one or more Hyper Text Markup Language ("HTML") files responsive to the HTTP request. The client device 1706 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, transportation matching system 102 may be a network-addressable computing system that can host a transportation matching network. The transportation matching system 102 may generate, store, receive, and send data, such as, for example, user-profile data, concept-profile data, text data, transportation request data, GPS location data, provider data, requester data, vehicle data, or other suitable data related to the transportation matching network. This may include authenticating the identity of providers and/or vehicles who are authorized to provide transportation services through the transportation matching system 102. In addition, the transportation matching system 102 may manage identities of service requesters such as users/requesters. In particular, the transportation matching system 102 may maintain requester data such as driving/riding histories, personal data, or other user data in addition to navigation and/or traffic management services or other location services (e.g., GPS services).

In particular embodiments, the transportation matching system 102 may manage transportation matching services to connect a user/requester with a vehicle and/or provider. By managing the transportation matching services, the transportation matching system 102 can manage the distribution and allocation of resources from vehicle systems and user resources such as GPS location and availability indicators, as described herein.

The transportation matching system 102 may be accessed by the other components of network environment 1700 either directly or via network 1704. In particular embodiments, the transportation matching system 102 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the transportation matching system 102 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1706, or a transportation matching system 102 to manage, retrieve, modify, add, or delete, the information stored in data store.

In particular embodiments, the transportation matching system 102 may provide users with the ability to take actions on various types of items or objects, supported by the transportation matching system 102. As an example, and not by way of limitation, the items and objects may include transportation matching networks to which users of the transportation matching system 102 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in the transportation matching system 102 or by an external system of a third-party system, which is separate from transportation matching system 102 and coupled to the transportation matching system 102 via a network 1704.

In particular embodiments, the transportation matching system 102 may be capable of linking a variety of entities. As an example, and not by way of limitation, the transportation matching system 102 may enable users to interact with each other or other entities, or to allow users to interact with these entities through an application programming interfaces ("API") or other communication channels.

In particular embodiments, the transportation matching system 102 may include a variety of servers, sub-systems, programs, modules, logs, and data stores. In particular embodiments, the transportation matching system 102 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile (e.g., provider profile or requester profile) store, connection store, third-party content store, or location store. The transportation matching system 102 may also include suitable components such as network interfaces, security mechanisms, load balancers, failover servers, management-and-network-operations consoles, other suitable components, or any suitable combination thereof. In particular embodiments, the transportation matching system 102 may include one or more user-profile stores for storing user profiles for transportation providers and/or transportation requesters. A user profile may include, for example, biographic information, demographic information, behavioral information, social information, or other types of descriptive information, such as interests, affinities, or location.

The web server may include a mail server or other messaging functionality for receiving and routing messages between the transportation matching system 102 and one or more client devices 1706. An action logger may be used to receive communications from a web server about a user's actions on or off the transportation matching system 102. In conjunction with the action log, a third-party-content-object log may be maintained of user exposures to third-party-content objects. A notification controller may provide information regarding content objects to a client device 1706. Information may be pushed to a client device 1706 as notifications, or information may be pulled from client device 1706 responsive to a request received from client device 1706. Authorization servers may be used to enforce one or more privacy settings of the users of the transportation matching system 102. A privacy setting of a user determines how particular information associated with a user can be shared. The authorization server may allow users to opt in to or opt out of having their actions logged by the transportation matching system 102 or shared with other systems, such as, for example, by setting appropriate privacy settings. Third-party-content-object stores may be used to store content objects received from third parties. Location stores may be used for storing location information received from client devices 1706 associated with users.

In addition, the vehicle subsystem 1708 can include a human-operated vehicle or an autonomous vehicle. A provider of a human-operated vehicle can perform maneuvers to pick up, transport, and drop off one or more requesters according to the embodiments described herein. In certain embodiments, the vehicle subsystem 1708 can include an autonomous vehicle—i.e., a vehicle that does not require a human operator. In these embodiments, the vehicle subsystem 1708 can perform maneuvers, communicate, and otherwise function without the aid of a human provider, in accordance with available technology.

In particular embodiments, the vehicle subsystem 1708 may include one or more sensors incorporated therein or associated thereto. For example, sensor(s) can be mounted on the top of the vehicle subsystem 1708 or else can be located within the interior of the vehicle subsystem 1708. In certain embodiments, the sensor(s) can be located in multiple areas at once—i.e., split up throughout the vehicle subsystem 1708 so that different components of the sensor (s) can be placed in different locations in accordance with optimal operation of the sensor(s). In these embodiments, the sensor(s) can include motion-related components such as an inertial measurement unit ("IMU") including one or more accelerometers, one or more gyroscopes, and one or more magnetometers. The sensor(s) can additionally or alternatively include a wireless IMU ("WIMU"), one or more cameras, one or more microphones, or other sensors or data input devices capable of receiving and/or recording information relating to navigating a route to pick up, transport, and/or drop off a requester.

In particular embodiments, the vehicle subsystem 1708 may include a communication device capable of communicating with the client device 1706 and/or the geotemporal destination system 104. For example, the vehicle subsystem 1708 can include an on-board computing device communicatively linked to the network 1704 to transmit and receive data such as GPS location information, sensor-related information, requester location information, or other relevant information.

In the foregoing specification, the disclosed features have been described with reference to specific exemplary embodiments thereof. Various embodiments and aspects of the features are described with reference to details discussed herein, and the accompanying drawings illustrate the various embodiments. The description above and drawings are illustrative and are not to be construed as limiting. Numerous specific details are described to provide a thorough understanding of various embodiments of the disclosed features.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope is, therefore, indicated by the appended claims rather than by the foregoing description. All changes that come within the meaning and range of equivalency of the claims are to be embraced within their scope.

What is claimed is:

1. A computer-implemented method comprising:

detecting that a provider device initiates a destination mode session within a provider application running on the provider device;

providing, for display on the provider device, a destination mode interface comprising a deviation angle element selectable to set a magnitude of a modifiable threshold deviation angle relative to a target direction toward a target destination;

detecting, via a touch screen of the provider device, an interaction to slide the deviation angle element to set the magnitude of the modifiable threshold deviation angle;

based on detecting the interaction, generating a directional filter for selecting transportation requests for the provider device;

based on determining that a transportation request from among candidate transportation requests detected during the destination mode session satisfies the directional filter, selecting the provider device to service the transportation request; and providing, for display within the destination mode interface presented on the provider device, information associated with the transportation request.

2. The computer-implemented method of claim 1, further comprising:

providing, for display on the provider device, a destination mode session element within the provider application; and detecting that the provider device initiates the destination mode session based on user interaction with the destination mode session element.

3. The computer-implemented method of claim 1, further comprising:

generating, based on historical transportation requests transmitted to the provider device, an initial deviation angle; and providing, for display, the initial deviation angle as an initial magnitude of the modifiable threshold deviation angle via the deviation angle element within the destination mode interface of the provider application running on the provider device.

4. The computer-implemented method of claim 1, further comprising:

providing, for display via the provider device, a user interface comprising a target destination location selection element;

receiving, based on user interaction with the target destination location selection element, a target destination for the destination mode session; and initiating the destination mode session based on comparing the target destination to a target destination distance threshold.

5. The computer-implemented method of claim 1, further comprising: terminating the destination mode session based on detecting that the provider device is not progressing toward the target destination.

6. The computer-implemented method of claim 1, further comprising: terminating the destination mode session based on detecting that a region corresponding to the provider device fails to satisfy a threshold number of transportation requests.

7. The computer-implemented method of claim 1, further comprising:

providing, for display on the provider device, the magnitude of the modifiable threshold deviation angle via the deviation angle element of the destination mode interface; and detecting, via the touch screen of the provider device, an additional interaction to further modify the deviation angle element to set a modified magnitude of the modifiable threshold deviation angle.

8. The computer-implemented method of claim 7, further comprising based on detecting the additional interaction, generating a modified directional filter for selecting transportation requests for the provider device.

9. A system comprising:

at least one processor; and a non-transitory computer readable medium comprising instructions that, when executed by the at least one processor, cause the system to:

detect that a provider device initiates a destination mode session within a provider application running on the provider device;

provide, for display on the provider device, a destination mode interface comprising a deviation angle element selectable to set a magnitude of a modifiable threshold deviation angle relative to a target direction toward a target destination;

provide, for display on the provider device, the magnitude of the modifiable threshold deviation angle via the deviation angle element of the destination mode interface;

detect, via a touch screen of the provider device, an interaction to modify the deviation angle element to set the magnitude of the modifiable threshold deviation angle;

based on detecting the interaction, generate a directional filter for selecting transportation requests for the provider device;

detect, via the touch screen of the provider device, an additional interaction to further modify the deviation angle element to set a modified magnitude of the modifiable threshold deviation angle;

based on detecting the additional interaction, generate a modified directional filter for selecting transportation requests for the provider device;

based on determining that a transportation request from among candidate transportation requests detected during the destination mode session satisfies the modified directional filter, select the provider device to service the transportation request; and provide, for display within the destination mode interface presented on the provider device, information associated with the transportation request.

10. The system of claim 9, further comprising instructions that, when executed by the at least one processor, cause the system to:

provide, for display on the provider device, a destination mode session element within the provider application; and detect that the provider device initiates the destination mode session based on user interaction with the destination mode session element.

11. The system of claim 9, further comprising instructions that, when executed by the at least one processor, cause the system to:

generate, based on historical transportation requests transmitted to the provider device, an initial deviation angle; and provide, for display, the initial deviation angle as the magnitude of the modifiable threshold deviation angle via the deviation angle element within the destination mode interface of the provider application running on the provider device.

12. The system of claim 9, further comprising instructions that, when executed by the at least one processor, cause the system to terminate the destination mode session based on detecting that the provider device is not progressing toward the target destination.

13. The system of claim 9, further comprising instructions that, when executed by the at least one processor, cause the system to terminate the destination mode session based on detecting that a region corresponding to the provider device fails to satisfy a threshold number of transportation requests.

14. The system of claim 9, further comprising instructions that, when executed by the at least one processor, cause the system to:

provide, for display via the provider device, a user interface comprising a target destination location selection element; and receive, based on user interaction with the target destination location selection element, a target destination for the destination mode session.

15. The system of claim 14, further comprising instructions that, when executed by the at least one processor, cause the system to initiate the destination mode session based on comparing the target destination to a target destination distance threshold.

16. A non-transitory computer readable medium comprising instructions that, when executed by at least one processor, cause a computing device to:

detect that a provider device initiates a destination mode session within a provider application running on the provider device;

provide, for display on the provider device, a destination mode interface comprising a deviation angle element selectable to set a magnitude of a modifiable threshold deviation angle relative to a target direction toward a target destination;

detect, via a touch screen of the provider device, an interaction to slide the deviation angle element to set the magnitude of the modifiable threshold deviation angle;

based on detecting the interaction, generate a directional filter for selecting transportation requests for the provider device;

based on determining that a transportation request from among candidate transportation requests detected during the destination mode session satisfies the directional filter, select the provider device to service the transportation request; and provide, for display within the destination mode interface presented on the provider device, information associated with the transportation request.

17. The non-transitory computer readable medium of claim 16, further comprising instructions that, when executed by the at least one processor, cause the computing device to:

generate, based on historical transportation requests transmitted to the provider device, an initial deviation angle; and provide, for display, the initial deviation angle as an initial magnitude of the modifiable threshold deviation angle via the deviation angle element within the destination mode interface of the provider application running on the provider device.

18. The non-transitory computer readable medium of claim 16, further comprising instructions that, when executed by the at least one processor, cause the computing device to terminate the destination mode session based on at least one of:

detecting that the provider device is not progressing toward the target destination; or detecting that a region corresponding to the provider device fails to satisfy a threshold number of transportation requests.

19. The non-transitory computer readable medium of claim 16, further comprising instructions that, when executed by the at least one processor, cause the computing device to:

provide, for display on the provider device, the magnitude of the modifiable threshold deviation angle via the deviation angle element of the destination mode interface; and detecting, via the touch screen of the provider device, an additional interaction to further modify the deviation angle element to set a modified magnitude of the modifiable threshold deviation angle.

20. The non-transitory computer readable medium of claim 19, further comprising instructions that, when executed by the at least one processor, cause the computing device to based on detecting the additional interaction, generate a modified directional filter for selecting transportation requests for the provider device.

* * * * *